United States Patent [19]

Jaques et al.

[11] 3,862,121
[45] Jan. 21, 1975

[54] ETHER AND ESTER SUBSTITUTED D-GLYCOFURANOSIDE COMPOUNDS

[75] Inventors: Roland Jaques, Allschwil; Jaroslav Stanek, Birsfelden; Alberto Rossi, Oberwil, all of Switzerland

[73] Assignee: Ciba-Geigy Corporation, Ardsley, N.Y.

[22] Filed: Oct. 20, 1971

[21] Appl. No.: 191,084

[30] Foreign Application Priority Data
Nov. 13, 1970  Switzerland............................ 16792
July 20, 1971  Switzerland............................ 10652

[52] U.S. Cl...... 260/210 R, 260/209 R, 260/234 R, 424/180
[51] Int. Cl............................................. C07c 47/18
[58] Field of Search...................... 260/210 R, 234 R

[56] References Cited
UNITED STATES PATENTS

| | | | |
|---|---|---|---|
| 3,157,634 | 11/1964 | Druey et al. | 260/210 R |
| 3,494,913 | 2/1970 | Rossi | 260/210 R |
| 3,530,113 | 9/1970 | Rossi | 260/210 R |
| 3,542,761 | 11/1970 | Rossi | 260/210 R |
| 3,655,884 | 4/1972 | Rossi et al. | 260/209 R |

*Primary Examiner*—Johnnie R. Brown
*Attorney, Agent, or Firm*—Theodore O. Groeger; Joseph G. Kolodny; John J. Maitner

[57]  ABSTRACT

O-Esters of monosaccharides which esters include at least one monosaccharide hydroxyl group esterified by the acyl radical of an araliphatic carboxylic acid having an antiinflammatory action, the or each remaining saccharide hydroxyl group being free, etherified by hydrocarbon radical which may be substituted or unsubstituted, or esterified by the acyl radical of an organic acid, with the proviso that if a glucofuranoside is only esterified at the 2-hydroxyl group by the acyl radical of an araliphatic carboxylic acid having an antiinflammatory action, the acyl radical is not the acyl radical of a phenyl-, lower alkoxyphenyl-, lower alkylphenyl-, trifluoromethylphenyl- or halogenophenyl-aliphatic carboxylic acid, and its salts, are useful as agents for treatments where anti-inflammatory (antiphlogistic) activity is required.

6 Claims, No Drawings

ETHER AND ESTER SUBSTITUTED D-GLYCOFURANOSIDE COMPOUNDS

The present invention provides O-esters of a monosaccharide which esters include at least one monosaccharide hydroxyl group esterified by the acyl radical of an araliphatic carboxylic acid having an anti-inflammatory action, the remaining saccharide hydroxyl groups being free, etherified by a hydrocarbon radical which may be substituted or unsubstituted or esterified by the acyl radical of an organic acid (with the proviso that if a glucofuranoside is only esterified at the 2-hydroxyl group by the acyl radical of an araliphatic carboxylic acid having an anti-inflammatory action, the acyl radical is not the acyl radical of a phenyl-, lower alkoxyphenyl-, lower alkylphenyl-, trifluoromethylphenyl- or halogenophenylaliphatic carboxylic acid) salts of those O-esters which include salt-forming groups, and processes for the manufacture of the O-esters.

The monosaccharides used in accordance with the invention are aldoses or ketoses with 4 to 7, preferably 5 or 6, chain carbon atoms. Preferred monosaccharides are aldopentoses and aldohexoses, as well as corresponding ketopentoses and ketohexoses. The monosaccharides may be present in the form of a straight chain or in the semi-acetal or semi-ketal form, for example as corresponding furanoses or pyranoses.

Aldopentoses include arabinoses, riboses, lyxoses and xyloses, whilst aldohexoses include glucoses, mannoses, alloses, altroses, taloses, galactoses, idoses or guloses, and also corresponding desoxy compounds, for example 2-desoxyriboses, 6-desoxyglucoses or 6-desoxyidoses. These aldoses are in the form of D- or L-aldoses and, in the O-esters of the invention, are preferably in the semiacetal form and are especially in the furanose form, although they may also be in the pyranose form. The aldoses can occur in the form of anomer mixtures or of pure α- or β-anomers. 1,4-Anhydroglucitols are particularly advantageous for use in the O-esters of the invention.

Ketopentoses include erythro-pentuloses or threo-pentuloses, while ketohexoses include alluloses, fructoses, sorboses and tagatoses and also corresponding desoxy compounds. These ketoses are in the form of D- or L-ketoses, are optionally in the semi-ketal form, and can occur in the form of anomer mixtures or of pure anomers.

An acyl radical of an araliphatic carboxylic acid possessing an anti-inflammatory action is preferably a radical of the formula Ar - A - CO -, wherein Ar represents an aryl radical or a heterocyclic radical of aromatic character, A represents a bivalent aliphatic hydrocarbon radical with 1 to 3 carbon atoms which may be unsubstituted or substituted by one or more substituents selected from monovalent and bivalent hydrocarbon radicals and hydroxyl groups, which hydroxyl groups may be functionally modified; if a bivalent hydrocarbon radical is a substituent of A, this radical can be bonded to the same or to different carbon atoms of A or can, together with Ar, form a carbocyclic ring fused onto Ar.

In etherified hydroxyl groups the etherifying hydrocarbon radical, which may be unsubstituted or substituted, may be an aliphatic, cycloaliphatic, cycloaliphaticaliphatic, aromatic or araliphatic hydrocarbon group, any of which groups may be substituted or unsubstituted.

In esterified hydroxyl groups the acyl radical of an organic acid is, in particular, the acyl radical of an organic carboxylic acid wherein the organic radical is a hydrocarbon radical which may be substituted or unsubstituted, for example an aliphatic, cycloaliphatic, cycloaliphatic-aliphatic, aromatic or araliphatic hydrocarbon radical or a heterocyclic or heterocyclicaliphatic radical, any of which radicals may be substituted or unsubstituted. The acyl radical of an organic acid may also be the acyl radical of a carbonic acid half-derivative, especially of a carbonic acid half-ester or of an carbonic acid half-amide which half-amide may be unsubstituted or N-substituted, wherein the esterifying part, or a N-substituent of the half-amide, is a hydrocarbon radical which may be substituted or unsubstituted, for example, an aliphatic, cycloaliphatic, cycloaliphaticaliphatic, aromatic or araliphatic hydrocarbon radical or a heterocyclic or heterocyclic-aliphatic radical, any of which radicals may be substituted or unsubstituted. The acyl radical may also be the acyl radical of an appropriate sulphonic acid.

Hydrocarbon radicals may be bivalent, but are preferably monovalent, hydrocarbon radicals.

In compounds according to the invention two hydroxyl groups, in aldoses preferably the hydroxyl groups in the 1- and 2-position, can be conjointly etherified by an ylidene radical (that is to say protected as an acetal or ketal). Such a radical may advantageously be an unsubstituted, or preferably a monosubstituted or disubstituted, methylene group. Substituents for the methylene group are advantageously monovalent or bivalent aliphatic hydrocarbon radicals which radicals may be substituted or unsubstituted, preferably lower alkyl radicals, for example ethyl, n-propyl, isopropyl or n-butyl radicals and especially methyl radicals, and also lower alkylene radicals with 4 to 6 chain carbon atoms, for example 1,4-butylene or 1,5-pentylene radicals. Possible substituents for these hydrocarbon radicals include, for example, lower alkyl, hydroxyl, or lower alkoxy groups or halogen atoms, and also aromatic groups, for example phenyl groups, which phenyl groups may be unsubstituted or substituted, for example by one or more substituents selected from lower alkyl, hydroxyl or lower alkoxy groups or halogen atoms. Other possible substituents of the methylene groups include, for example, aromatic radicals, for example phenyl groups which may be unsubstituted or substituted, for example as indicated above, and free or functionally modified (for example esterified) carboxyl groups, for example carbo-lower alkoxy groups, for example carbomethoxy or carboethoxy groups. The isopropylidene group, and above all the benzylidene group, are preferred as ylidene groups.

A radical of aliphatic character is a radical of which the free bond starts from an atom which is not a member of an aromatic system. Lower radicals are those possessing up to 7 C-atoms.

An aliphatic hydrocarbon radical may be a straight-chain or branched aliphatic hydrocarbon radical, above all a lower aliphatic hydrocarbon radical, for example a lower alkenyl or lower alkinyl radical and especially a lower alkyl radical which can, for example, contain up to 7, and preferably up to 4, carbon atoms. Such radicals may be unsubstituted or monosubstituted, disubstituted or polysubstituted by heterocyclic radicals and or by functional groups; when there is more than one substituent, the substituents may be the same or different. Examples of suitable functional groups are free or functionally modified hydroxyl or mercapto groups, amino groups which may be substituted or unsubstituted, lower alkylsulphinyl or lower alkylsulphonyl groups, acyl groups (for example lower alkanoyl groups or arylcarbonyl radicals), carboxyl groups which may be functionally modified (for example lower alkoxycarbonyl groups, carbamoyl groups which may be unsubstituted or N-substituted, or nitrile groups), and sulphonic acid groups which may be functionally modified (for example sulphamoyl groups which may be unsubstituted or N-substituted).

A cycloaliphatic or cycloaliphatic-aliphatic hydrocarbon radical may be, for example, a monocyclic, bicyclic or polycyclic cycloalkyl or cycloalkenyl group, or a cycloalkyl- or cycloalkenyl-lower alkyl or -lower alkenyl group, wherein a cycloalkyl radical contains for example up to 12, advantageously 3 to 8, preferably 5 to 8, ring carbon atoms, whilst a cycloalkenyl radical possesses for example up to 12, advantageously 3 to 8, preferably 5 to 8, ring carbon atoms and if possible 2, and in particular 1, double bonds, and the aliphatic part of a cycloaliphatic-aliphatic radical can, for example, contain up to 7, preferably up to 4, carbon atoms. These cycloaliphatic or cycloaliphatic-aliphatic radicals can, if desired, be monosubstituted, disubstituted or polysubstituted, for example, by hydrocarbon radicals which may be substituted or unsubstituted (for example those mentioned above) or, for example like the above aliphatic hydrocarbon radicals, by functional groups and/or by heterocyclic radicals.

An aryl radical is an aromatic hydrocarbon radical, for example a monocyclic, bicyclic or polycyclic aromatic hydrocarbon radical, and in particular a phenyl radical or a naphthyl radical, which may be unsubstituted or monosubstituted, disubstituted or polysubstituted, for example by nitro groups or like the above-mentioned aliphatic and cycloaliphatic hydrocarbon radicals; where there are more than two substituents, these substituents can be the same or different. The aryl radical can also, together with a cycloaliphatic ring, form the ring of a condensed ring system, especially a 5-H-dibenzo[a,d] cycloheptenyl or a 10,11-dihydro-5-H-dibenzo[a,d]cycloheptenyl radical.

An araliphatic hydrocarbon radical is an aliphatic hydrocarbon radical possessing, for example, up to 3, and preferably 1, monocyclic, bicyclic or polycyclic aromatic hydrocarbon radicals and is preferably a phenyl-lower alkyl or a phenyl-lower alkenyl or phenyl-lower alkinyl radical; such radicals contain, for example, up to 3, and preferably 1, phenyl groups and may be unsubstituted or monosubstituted, disubstituted or polysubstituted in the aromatic and/or aliphatic part, for example like the above-mentioned aliphatic and aromatic hydrocarbon radicals.

Heterocyclic radicals of aromatic character include monocyclic as well as bicyclic or polycyclic, preferably azacyclic, thiacyclic, oxacyclic, thiazacyclic, oxazacyclic or diazacyclic radicals of aromatic character, which radicals may be unsubstituted or monosubstituted, disubstituted or polysubstituted at a hetero atom or carbon atom, for example like the above-mentioned aromatic hydrocarbon radicals.

The term "heterocyclic radical of aromatic character" also includes a 6-membered monocyclic, thiazacyclic or oxazacyclic, ring as well as a partially hydrogenated 5-membered or 6-membered heterocyclic structure of aromatic character, which is ortho-condensed to at least one benzene nucleus and is bonded via this nucleus to A, and which heterocyclic ring or structure may be unsubstituted or monosubstituted, disubstituted or polysubstituted, for example like the above-mentioned aromatic hydrocarbon radicals. The heterocyclic radical of aromatic character may be, for example, a radical derived from phenothiazine, phenoxazine, indoline, isoindoline, 10,11-dihydro-5H-dibenz[b,f]azepine or 1,2,3,4,-tetrahydroquinoline. In these radicals, where possible, the two hydrogen atoms in one or more $CH_2$ groups located in the ring can be replaced by an oxo group.

Heterocyclic substituents, especially when present as substituents of Ar when the latter denotes an aromatic hydrocarbon radical, preferably a phenyl radical, may be bonded via a ring carbon atom or via an aza nitrogen atom and may be the above-mentioned heterocyclic radicals of aromatic character or their partially hydrogenated or perhydrogenated derivatives, or six-membered monocyclic, thiazacyclic or oxazacyclic, radicals. The heterocyclic substituents may be unsubstituted or monosubstituted, disubstituted or polysubstituted, for example, like the above-mentioned radicals. In these radicals, where possible, the two hydrogen atoms in one or more $CH_2$ groups located in the ring can be replaced by an oxo group.

A bivalent hydrocarbon radical is, for example, a radical of this nature which is derived from one of the above-mentioned monovalent hydrocarbon radicals, preferably from a cycloaliphatic, cycloaliphatic-aliphatic, araliphatic or aromatic hydrocarbon radical any of which radicals may be unsubstituted, but especially from an aliphatic hydrocarbon radical which may be substituted or unsubstituted, by splitting off a further hydrogen atom from the skeleton of the hydrocarbon and in which the hydrocarbon skeleton and the substituents are the same as in the case of the above-mentioned mono-valent hydrocarbon radicals. A bivalent hydrocarbon radical is preferably a lower alkylene, lower alkenylene, lower alkinylene or lower alkylidene, lower alkenylidene or lower alkinylidene radical with, for example, up to 7 carbon atoms, or an o-phenylene radical, and these radicals can be unsubstituted or monosubstituted, disubstituted or polysubstituted, for example like the above-mentioned aliphatic and cycloaliphatic hydrocarbon radicals.

A bivalent hydrocarbon radical bonded to the same C atom of A is advantageously a lower aliphatic bivalent radical, especially a lower alkylene radical or a lower alkenylene or lower alkinylene radical with up to 7 C atoms, but preferably a lower alkylene radical with 1 or 2 C atoms or a lower alkylidene radical, as well as a lower alkenylidene or lower alkinylidene radical, which can, for example, contain up to 7, preferably up to 4, C atoms. These radicals may be monosubstituted, disubstituted or polysubstituted, for example like the above-mentioned aliphatic and cycloaliphatic hydrocarbon radicals, but are preferably unsubstituted.

A bivalent radical bonded to different C atoms of A is advantageously a bivalent lower aliphatic radical bonded to two adjacent C atoms of A, especially a lower alkylene radical or a lower alkenylene or a lower alkinylene radical, for example with up to 7 C atoms, but preferably a methylene group. These radicals may be monosubstituted, disubstituted or polysubstituted, for example like the above-mentioned aliphatic and cycloaliphatic hydrocarbon radicals, but are preferably unsubstituted.

Acyl radicals with esterify hydroxyl groups are advantageously radicals of aliphatic carboxylic acids, for example those of lower alkanecarboxylic acids and of lower alkenecarboxylic acids, and radicals of lower alkanedicarboxylic acids or lower alkenedicarboxylic acids, or of aryl-, or aryl-lower alkanecarboxylic or aryl-lower alkenecarboxylic acids.

Acyl radicals of lower alkanecarboxylic acids are, in particular, those of acetic acid or propionic acid, those of lower alkanedicarboxylic acids, for example with 2 to 7, preferably 3 to 6, carbon atoms, or of lower alkenedicarboxylic acids, for example with 4 to 7 carbon atoms, for example those of malonic, 2-methylsuccinic, glutaric, 3-methylglutaric, 3-ethylglutaric, adipic or pimelic acid, advantageously succinic acid, or maleic or fumaric acid.

Acyl radicals of arylcarboxylic acids may, for example, be benzoyl, naphthoyl-(1) or napththoyl-(2) radicals.

Acyl radicals of aryl-lower alkanecarboxylic or aryl-lower alkenecarboxylic acids may be, for example, phenylacetyl, α- or β-phenylpropionyl or cinnamoyl radicals.

Acyl radicals of organic sulphonic acids may be, for example, those of aliphatic or aromatic sulphonic acids in which aliphatic and aromatic radicals are those mentioned above, for example, lower alkanesulphonic acids, for example, methanesulphonic or ethanesulphonic acids, or arylsulphonic acids, for example, benzenesulphonic or toluenesulphonic acids.

Cycloaliphatic, cycloaliphatic-aliphatic or heterocyclic radicals of organic carboxylic acids or sulphonic acids are advantageously the preferentially mentioned cycloaliphatic and cycloaliphatic-aliphatic hydrocarbon radicals or the preferentially mentioned heterocyclic radicals of aromatic character, a heterocyclic-aliphatic radical of these acids being, in particular, a heterocyclic-aliphatic radical comprising a preferentially mentioned heterocyclic radical of aromatic character and a preferentially mentioned aliphatic radical.

The acyl radical of a carbonic acid half-ester is advantageously a lower alkoxycarbonyl radical which may be unsubstituted or substituted in the lower alkyl part, or a lower alkenyloxycarbonyl, cycloalkoxycarbonyl, phenyloxycarbonyl or phenyl-lower alkoxycarbonyl radical, any of which radicals may be unsubstituted or substituted in the lower alkenyl, cycloalkyl, phenyl or phenyl-lower alkyl part respectively, or a lower alkoxycarbonyl radical which contains a heterocyclic group of aromatic character in the lower alkyl radical, which heterocyclic group may be unsubstituted or substituted.

A lower alkyl radical may be, for example, a methyl, ethyl, n-propyl, isopropyl, n-butyl, isobutyl, sec.-butyl or tert.-butyl, or n-pentyl, isopentyl, n-hexyl, isohexyl or n-heptyl group, whilst a lower alkenyl radical may, for example, be a vinyl, allyl, isopropenyl, 2- or 3-methallyl or 3-butenyl group and a lower alkinyl radical may, for example, be an ethinyl, propargyl or 2-butinyl group.

Substituted lower aliphatic hydrocarbon radicals preferably contain one or more hydroxyl and/or lower alkoxy groups and are advantageously hydroxy- or lower alkoxy-lower alkyl radicals in which the hydroxyl or lower alkoxy groups are preferably separated by at least 2 carbon atoms from the oxygen atom which carries a lower aliphatic radical substituted in such a way, for example 2-hydroxyethyl, 2-hydroxypropyl, 3-hydroxypropyl, 2,3-dihydroxypropyl, 2-methoxyethyl, 2-ethoxyethyl, 2-methoxypropyl, 3-methoxypropyl, 3-ethoxypropyl, and hydroxymethyl, radicals.

A cycloalkyl group may be, for example, a cyclopropyl, cyclobutyl, cyclopentyl, cyclohexyl or cycloheptyl, cyclooctyl or adamantyl group, and a cycloalkenyl group may be, for example, a 1-, 2- or 3-cyclopentenyl, 1-, 2- or 3-cyclohexenyl, 1-cycloheptenyl, 1-cyclooctenyl, or a 2-cyclopropenyl, group. A cycloalkyl-lower alkyl or cycloalkyl-lower alkenyl radical may be, for example, a cyclopropyl-, cyclopentyl-, cyclohexyl- or cycloheptylmethyl, -1,1-ethyl or -1,2-ethyl, -1,1-, -1,2- or -1,3- propyl, -vinyl or -allyl group, while a cycloalkenyl-lower alkyl or cycloalkenyl-lower alkenyl group may be, for example, a 1-, 2- or 3-cyclopentenyl-, 1-, 2- or 3-cyclohexenyl- or 1-, 2- or 3-cycloheptenyl-methyl, -1,1- or -1,2-ethyl, -1,1-, -1,2- or -1,3-propyl, -vinyl or -allyl group.

A napthyl radical may be a 1- or 2-naphthyl radical. A 5-H-dibenzo[a,d]cycloheptenyl radical is preferably a 5-H-dibenzo[a,d]cycloheptenyl-2 radical, and a 10,11-dihydro-5-H-dibenzo[a,d]cycloheptenyl radical is preferably a 10,11-dihydro-5-H-dibenzo[a,d]cycloheptenyl-2 radical. Substituents of a phenyl or a napthyl radical are advantageously selected from halogen atoms and lower alkyl, lower alkoxy and trifluoromethyl groups.

A phenyl-lower alkyl, phenyl-lower alkenyl or phenyl-lower alkinyl radical is advantageously a benzyl radical or a 1- or 2-phenylethyl, 1-, 2- or 3-phenylpropyl, diphenylmethyl, trityl, 1- or 2-naphthylmethyl, styryl, cinnamyl, phenylpropin-1-yl or 1- or 3-phenylpropin-2-yl radical. A substituted phenyl-lower alkyl radical is advantageously a benzyl radical which can be monosubstituted, disubstituted or polysubstituted in the phenyl nucleus, and in the same case of multiple substitution substituents of different types can be present. Substituents may be selected from halogen atoms, lower alkyl groups, lower alkoxy or trifluoromethyl groups; benzyl radicals which are monosubstituted in the nucleus preferably contain a substituent in the p-position.

Heterocyclic radicals of aromatic character may be, for example, monocyclic, monoazacyclic, monothiacyclic or monooxacylic, radicals of aromatic character, for example pyridyl radicals (for example pyridyl-(2), pyridyl-(3) or pyridyl-(4) radicals), thienyl radicals (for example thienyl-(2) radicals), furyl radicals (for example furyl-(2) radicals) or pyrrolyl radicals (for example pyrrolyl-(2) or pyrrolyl-(3) radicals) or bicyclic monoazacyclic radicals of aromatic character, for example quinolinyl radicals (for example quinolinyl-(2) or quinolinyl-(4) radicals) or isoquinolinyl radicals (for example isoquinolinyl-(1) radicals) or monocyclic thiazacylic or oxazacyclic or diazacyclic radicals of aromatic character, for example oxazolyl, isoxazolyl, thiazolyl, isothiazolyl, or pyrimidinyl radicals. Heterocyclic-aliphatic radicals may be lower alkyl or lower alkenyl radicals containing heterocyclic radicals, especially those mentioned above.

A phenothiazinyl radical is preferably a phenothiazinyl-(2) radical, a phenoxazinyl radical is preferably a phenoxazinyl-(2) radical, an indolinyl ir isoindolinyl radical is preferably an indolinyl-(4) or isoindolinyl-(4) radical, a 1,2,3,4-tetrahydroquinolinyl radical is, for example a 1,2,3,4-tetrahydroquinolyl(5,6,7 or 8) radical, and a 10,11-dihydro-5H-dibenzo[b,f]-azepinyl radical is preferably a 10,11-dihydro-5H-dibenzo[b,f]-azepinyl-(3 or 4) radical. An example of a radical of this nature containing an oxo group is a 1-oxoisoindolinyl radical.

Partially hydrogenated or perhydrogenated derivatives of the above-mentioned aromatic heterocyclic radicals may be, for example, monocyclic, monoazacyclic, monothiacyclic or monooxacyclic, radicals, for example tetrahydrothienyl radicals (for example tetrahydrothienyl-(2) radicals), or tetrahydrofuryl radicals (for example tetrahydrofuryl-(2) radicals) preferably pyrrolidinyl or piperidyl radicals (for example pyrrolidinyl-(2 or 3) or piperidyl-(2,3 or 4) radicals), or monocyclic thiazacyclic, oxazacyclic or diazacyclic radicals, for example $\Delta^2$-oxazolinyl or $\Delta^4$-oxazolinyl radicals, oxazolidinyl radicals, $\Delta^2$-isoxazolinyl or $\Delta^4$-isoxazolinyl radicals, isoxazolidinyl radicals, $\Delta^2$-thiazolinyl or $\Delta^4$-thiazolinyl radicals, or thiazolidinyl radicals.

Six-membered monocyclic thiazacyclic or oxazacyclic radicals may be, for example, radicals possessing the 1,2-, 1,3- or 1,4-oxazine or -thiazine ring system, for example 2H-1,2-thiazinyl, 3,4-, 3,6- or 5,6-dihydro-2H-1,2-thiazinyl or tetrahydro-1,2-thiazinyl radicals, 4H-1,2-oxazinyl, 2,3- or 5,6-dihydro-4H-1,2-oxazinyl, 6H-1,2-oxazinyl or tetrahydro-1,2-oxazinyl radicals, 2H-1,3-oxazinyl, 3,4-, 5,6- or 3,6-dihydro-2H-1,3-oxazinyl 4H-1,3-oxazinyl, 5,6-dihydro-4H-1,3-oxazinyl or tetrahydro-1,3-oxazinyl radicals, 4H-1,4-oxazinyl, 2,3-dihydro-4H-1,4-oxazinyl or morpholinyl radicals, 2H-1,2-oxazinyl radicals or 5,6-dihydro-2H-1,2-oxazinyl radicals. Preferred radicals are 3,6-dihydro-2H-1,2-oxazinyl radicals.

A heterocyclic substituent bonded via an azanitrogen atom, especially a substituent of Ar when the latter denotes an aromatic hydrocarbon radical, preferably a phenyl radical, is advantageously a 1,2,3,4-tetrahydroquinolinyl-(1), 1,2,3,4-tetrahydro-isoquinolinyl-(2), phenoxazinyl-(10), phenothiazinyl-(10), indolinyl-(1), 10,11-dihydro-5H-dibenz[b,f]azepinyl-(5), $\Delta^4$-oxazolinyl-(3), $\Delta^4$-isoxazolinyl-(2), $\Delta^4$thiazolinyl-(3), 2H-1,2-thiazinyl-(2), 3,4-3,6- or 5,6-dihydro-2H-1,2-thiazinyl-(2), 2,3-dihydro-4H-1,2-oxazinyl-(2), 3,4- or 3,6-dihydro-2H-1,3-oxazinyl-(3), 4H-1,4-oxazinyl-(4), 2,3-dihydro-4H-1,4-oxazinyl-(4), 2H-1,2-oxazinyl-(2) or 5,6-dihydro-2H-1,2-oxazinyl-(2) radical, and is preferably a pyrrolyl-(1), isoindolinyl-(2) or 3,6-dihydro-2H-1,2-oxazinyl-(2) radical or, where possible, radicals of this nature containing oxo groups, preferably, for example, a 1-oxo-isoindolinyl-(2) radical.

Functionally modified hydroxyl groups are etherified or esterified hydroxyl groups, and functionally modified mercapto groups are, preferably, etherified mercapto groups.

An etherified hydroxyl group is preferably a lower alkoxy group (for example a methoxy, ethoxy, n-propoxy, isopropoxy, n-butoxy, isobutoxy, sec.-butoxy, tert.-butoxy, n-pentyloxy or tert.-pentyloxy group), a substituted lower alkoxy group (for example a halogen-lower alkoxy group) a lower alkenyloxy group (for example a vinyloxy or allyloxy group) a lower alkylenedioxy group (for example a methylenedioxy, ethylenedioxy, or isopropylidenedioxy group) a cycloalkoxy group (for example a cyclopentyloxy, cyclohexyloxy or adamantyloxy group) a phenoxy group, a phenyl-lower alkoxy group (for example a benzyloxy or 1- or 2-phenylethoxy group) or a lower alkoxy group substituted by a monocyclic, monoazacyclic, monooxacyclic or monothiacyclic group of aromatic character, for example a pyridyl-lower alkoxy group (for example a 2-pyridylmethoxy group) a furyl-lower alkoxy group (for example a furfuryloxy group) or a thienyl-lower alkoxy group (for example a 2-thenyloxy group).

An etherified mercapto group is preferably a lower alkylmercapto group (for example a methylmercapto or ethylmercapto group), a lower alkenylmercapto group (for example a vinylmercapto or allylmercapto group) a phenyl-mercapto group, or a phenyl-lower alkylmercapto group (for example a benzylmercapto group).

An esterified hydroxyl group is advantageously a halogen atom (for example a fluorine, chlorine, bromine or iodine atom) a lower alkanoyloxy group (for example an acetoxy or propionyloxy group) or a lower alkoxycarbonyloxy group (for example a methoxy-, ethoxy-, n-propoxy-, isopropoxy-, tert.-butoxy- or tert.-pentyloxy-carbonyloxy group).

A substituted amino group is a monosubstituted or disubstituted amino group in which the substituents are preferably selected from monovalent or bivalent aliphatic, cycloaliphatic, cycloaliphatic-aliphatic, aromatic or araliphatic hydrocarbon radicals, which radicals may be substituted or unsubstituted, and acyl groups. Examples of such amino groups are lower alkylamino or dilower alkylamino groups (for example methylamino, ethylamino, dimethylamino or diethylamino groups) phenylamino or N-phenyl- N-lower alkylamino groups (for example N-phenyl-N- methylamino or N-phenyl-N-ethylamino groups) lower alkyleneamino groups which may be uninterrupted or interrupted by one or more hetero atoms, for example oxygen atoms, sulphur atoms or nitrogen atoms which nitrogen atoms may be unsubstituted or substituted, for example by lower alkyl or acyl groups (for example pyrrolidino, piperidino, oxazolidino, isoxazolidino, thiazolidino, tetrahydro-1,2-oxazinyl-(2), tetrahydro-1,3-oxazinyl-(3), morpholino, tetrahydro-1,2-thiazinyl-(2), tetrahydro-1,3-thiazinyl-(3), thiomorpholino or 4-methyl-piperazino groups), lower alkenyleneamino groups (for example $\Delta^2$- or $\Delta^3$-pyrrolinyl groups) or acylamino groups, especially lower alkanoylamino or lower alkylsulphonylamino groups, for example acetylamino, propionylamino, methylsulphonamino or ethylsulphonamino groups.

Lower alkylsulphinyl groups may be, for example, methylsulphinyl, ethylsulphinyl or isopropylsulphinyl groups and lower alkylsulphonyl groups may be, for example, methylsulphonyl, ethylsulphonyl or isopropylsulphonyl groups.

A lower alkoxycarbonyl radical may be, for example, a methoxycarbonyl, ethoxycarbonyl, n-propoxycarbonyl, isopropoxycarbonyl, tert.-butoxycarbonyl or tert.-pentyloxycarbonyl group.

A lower alkenyloxycarbonyl group may be, for example, the vinyloxycarbonyl group, whilst a cycloalkoxycarbonyl and phenyl-lower alkoxycarbonyl group (in which the cycloalkyl radical and phenyl-lower alkyl radical may be, for example, as specified above) may be, for example, an adamantyloxycarbonyl, benzyloxycarbonyl, diphenylmethoxycarbonyl or α-biphenylyl-(4)-α-methylethoxycarbonyl group. A lower alkoxycarbonyl group in which the lower alkyl radical contains, for example, a monocyclic, monoazacyclic, monooxacyclic or monothiacyclic group, may be, for example, a furyl-lower alkoxycarbonyl group, for example a furfuryloxycarbonyl group or a thienyl-lower alkoxycarbonyl group, for example thenyl-(2)-oxycarbonyl group.

Examples of N-substituted carbamoyl groups are N-lower alkyl-carbamoyl or N,N-di-lower alkyl-carbamoyl groups, for example N-methylcarbamoyl, N-ethylcarbamoyl, N,N-dimethylcarbamoyl or N,N-diethylcarbamoyl groups.

Examples of N-substituted sulphamoyl groups are N-lower alkyl-sulphamoyl or N,N-di-lower alkylsulphamoyl groups, for example N-methylsulphamoyl, N-ethylsulphamoyl, N,N-dimethylsulphamoyl or N,N-diethylsulphamoyl groups.

The compounds of the invention possess valuable pharmacological properties and can be used accordingly. In particular, they show inflammation inhibiting properties and, in contrast to known compounds of similar structure, antinociceptive (analgesic) properties coupled with low toxicity. In contrast to known compounds of similar structure, the new compounds show pronounced anti-inflammatory effects in the adjuvants-arthritis test [based on the procedure described by Newbould, Brit. J. Pharmacol, Volume 21, pages 127 to 136 (1936)] when doses of about 0.003 g/kg to about 0.03 g/kg are orally administered to rats. Further, a pronounced analgesic component can be detected by means of the benzoquinone writhing syndrome test [based on the test procedure described by Siegmund et al., Proc.Soc.Exptl.Biol.Med., Volume 95, pages 729 to 733 (1957)] if doses of about 0.01 g/kg to about 0.05 g/kg are orally administered to mice. The compounds of the invention are therefore useful in applications where a substance possessing an anti-inflammatory (antiphlogistic) activity is required, for example an anti-exsudative or vascular permeability-inhibiting activity, and above all an anti-arthritic and analgesic activity. The compounds are especially useful for the treatment of inflammations of a rheumatic nature. They are also useful as valuable intermediate products, for example for the manufacture of other compounds, especially pharmacologically active compounds.

The invention more especially provides O-esters of pentoses and hexoses which esters include at least one hydroxyl group esterified by the acyl radical of the formula I

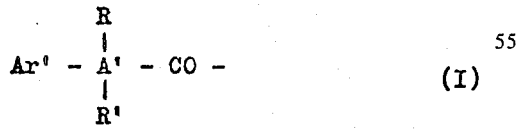

the remaining saccharide-hydroxyl groups being free, etherified by a hydrocarbon radical which may be substituted or unsubstituted or esterified by the acyl radical of an organic acid. In formula I, Ar' represents a phenyl radical which may be unsubstituted or substituted by one or more substituents, which may be the same or different, selected from cycloalkyl, cycloalkenyl, aryl, aryl-lower alkyl, cycloalkyl-lower alkyl, lower alkoxy, lower alkenyloxy, lower alkylmercapto, phenoxy, phenylmercapto, halogen, trifluoromethyl, nitrile, nitro, hydroxyl, mercapto, lower alkylamino, di-lower alkylamino, phenylamino, N-phenyl-N-lower alkylamino, and lower alkyleneamino groups (in which lower alkyleneamino groups the lower alkylene radical may be uninterrupted or interrupted by one or more oxygen atoms, sulphur atoms or nitrogen atoms which nitrogen atoms may be unsubstituted or substituted by one or more lower alkyl and/or lower alkanoyl groups), lower alkenyleneamino, lower alkanoylamino, carbamoyl, N-lower alkylcarbamoyl, N,N-di-lower alkylcarbamoyl sulphamoyl, N-lower alkylsulphamoyl, N,N-di-lower alkylsulphamoyl, lower alkylsulphone, lower alkylsulphine and benzoyl groups, and 1,2,3,4-tetrahydroquinolinyl-(1), 1,2,3,4-tetrahydro-isoquinolinyl-(2), phenoxazinyl-(10), phenothiazinyl-(10), indolinyl-(1), 10,11-dihydro-5H-dibenzo[b,f]-azepinyl-(5), Δ⁴oxazolinyl-(3), Δ⁴-isoxazolinyl-(2) or Δ⁴-thiazolinyl-(3), 2H-1,2-thiazinyl-(2), 3,4-, 3,6- or 5,6-dihydro-2H-1,2-thiazinyl-(2), 2,3-dihydro-4H-1,2-oxazinyl-(2), 3,4- or 3,6-dihydro-2H-1,3-oxazinyl-(3), -thiazolinyl-(4H-1,4-oxazinyl-(4), 2,3-dihydro-4H-1,4-oxazinyl-(4), 2H-1,2-oxazinyl-(2) or 5,6-dihydro-2H-1,2-oxazinyl-(2), and, preferably, pyrrolyl-(1), isoindolinyl-(2) or 3,6-dihydro-2H-1,2-oxazinyl-(2) or 1-oxo-isoindolinyl-(2) radicals, and lower alkyl or lower alkenyl groups, 2 lower alkyl groups in the ortho-position being able together to form a lower alkylene or lower alkenylene group, and the phenyl radical in a substituent of Ar', preferably in an appropriately substituted amino group, being able to contain, for example, one or more lower alkyl, lower alkoxy or trifluoromethyl radicals and/or halogen atoms as substituents, R and R' may be the same or different and each represents a hydrogen atom, a lower alkyl, lower alkenyl, lower alkinyl, lower alkylidene, lower alkenylidene or lower alkinylidene radical or a cycloalkyl, aryl-lower alkyl or aryl radical or R and R' together denote a lower alkylene or lower alkenylene radical bonded to two adjacent carbon atoms of A', and A' represents a bivalent aliphatic hydrocarbon radical with 1 to 3 carbon atoms, with the proviso that if a monosaccharide is only esterified at the 2-hydroxyl group by the acyl radical of a carboxylic acid having an anti-inflammatory action, the acyl radical is not the acyl radical of a phenyl-, lower alkoxyphenyl-, lower alkylphenyl-, trifluoromethylphenyl or halogenophenyl-aliphatic carboxylic acid. The invention also provides salts of those of the above esters which possess salt-forming groups.

Particularly valuable pharmacological properties are shown by hexofuranose compounds of the formula II

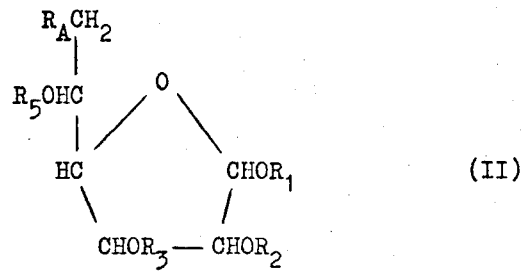

wherein $R_4$ represents a hydrogen atom or the radical $OR_6$ and wherein at least one of the radicals $R_1$, $R_2$, $R_3$, $R_5$ and $R_6$ represents an acyl radical of the formula I and, of the remaining radicals, $R_1$ preferably represents a hydrogen atom or a lower alkyl or lower alkenyl radical either of which radicals may be substituted or unsubstituted, but may also represent a cycloalkyl, cycloalkyl-lower alkyl or phenyl-lower alkyl radical, which radicals may be substituted or unsubstituted, or the acyl radical of a lower alkanecarboxylic or lower alkenecarboxylic acid or of a lower alkanedicarboxylic or lower alkenedicarboxylic acid, $R_2$, $R_3$, $R_5$ and $R_6$ may be the same or different and each preferably represent a hydrogen atom, a lower alkyl, lower alkenyl or phenyl-lower alkyl radical, which radicals may be substituted or unsubstituted, or the acyl radical of a lower alkanecarboxylic or lower alkenecarboxylic acid or of a lower alkanedicarboxylic or lower alkenedicarboxylic acid, but may also represent an optionally substituted cycloalkyl or cycloalkyl-lower alkyl radical, with the proviso that if only $R_2$ represents a radical of the formula I, this radical is not the acyl radical of a phenyl-, lower alkoxyphenyl-, lower alkylphenyl-, trifluoromethylphenyl- or halogenophenyl-aliphatic carboxylic acid. The invention also provides salts of those of the above hexafuranose compounds which possess salt-forming groups. Preferably, the hexafuranose compounds of the formula II, in addition to containing a hydroxyl group esterified by the acyl radical of the formula I, contain at least one etherified hydroxyl group.

Compounds which deserve particular mention are D-glucofuranose compounds of the formula III

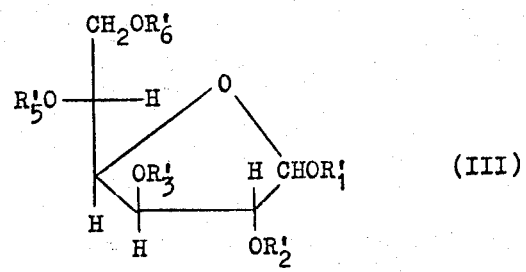

wherein at least 1, and preferably one or two, of the groups $R_1'$, $R_2'$, $R_3'$, $R_5'$ and $R_6'$ represents an acyl radical of the formula IV

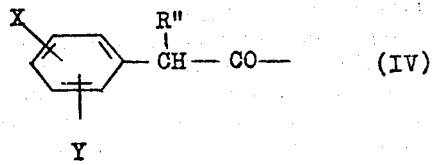

and, of the remaining radicals, $R_1'$ preferably represents a hydrogen atom or a lower alkyl radical, but may also represent a lower alkenyl radical or a lower alkoxy or hydroxy-lower alkyl radical, $R_2'$ preferably represents a hydrogen atom, a lower alkyl or lower alkenyl radical or the acyl radical of a lower alkanecarboxylic or lower alkenecarboxylic acid or a lower alkanedicarboxylic or lower alkenedicarboxylic acid, especially of an acetic, propionic or succinic acid, but may also represent a lower alkoxy or hydroxy-lower alkyl radical or a benzyl radical which may be unsubstituted or substituted in the phenyl radical by one or more substituents selected from halogen atoms and lower alkyl, lower alkoxy or trifluoromethyl groups, $R_3'$, $R_5'$ and $R_6'$ may be the same or different and each preferably represents a hydrogen atom, a lower alkyl or lower alkenyl radical, a benzyl radical which may be unsubstituted or substituted in the phenyl radical by one or more substituents selected from halogen atoms and lower alkyl, lower alkoxy or trifluoromethyl groups, or the acyl radical of a lower alkanecarboxylic or lower alkenecarboxylic acid or of a lower alkanedicarboxylic or lower alkenedicarboxylic acid, especially of an acetic, propionic or succinic acid, but may also represent a lower alkoxy or hydroxy-lower alkyl radical, $R''$ represents a hydrogen atom, a cycloalkyl radical or preferably a lower alkyl radical, X represents a hydrogen atom, a halogen atom or the trifluoromethyl group, and Y advantageously represents a phenyl radical, but preferably a 5-membered to 8-membered cycloalkyl radical with, preferably, one double bond, preferably in the $\Delta^1$-position, in the ring, but may also represent lower alkoxy or lower alkenyloxy radical or a preferably branched lower alkyl radical, or a mono- or di-lower alkylamino, lower alkyleneamino, lower alkenyleneamino, phenylamino or N-phenyl-N-lower alkylamino radical or a pyrrolyl-(1), 3,6-dihydro-2-H-1,2-oxazinyl-(2) or 1-oxoisoindolinyl-(2) radical, or salts of compounds of this nature which possess salt-forming groups. Preferably, the hexafuranose compounds of the formula III, in addition to containing a hydroxyl group esterified by the acyl radical of the formula IV, contain at least one etherified hydroxyl group.

Preferred compounds include ethyl-2-O-α-[biphenylyl-(4)]-propionyl-3,5,6-tri-O-n-propyl-D-glucofuranoside, ethyl-2-O-methyl-3,5-di-O-n-propyl-6-O-α-[3-chloro-4-cyclohexyl-phenyl]-propionyl-D-glucofuranoside, eth- -O-methyl-3,5-di-O-n-propyl-6O-α-[4-(cyclohexen-1-yl)-phenyl]-propionyl-D-glucofuranoside and ethyl-2-O-methyl-3,5-di-O-n-propyl-6-O-α-[biphenylyl-(4)]-propionyl-D-glucofuranoside, preferably ethyl-2-O-acetyl-3,5-di- -n-propyl-6-O-α[4-(cyclohexen-1-yl)-phenyl]-propionyl-D-glucofuranoside, ethyl-2-O-methyl-3-O-n-propyl-5,6-di-O-α-[4-(cyclohexen-1-yl)-phenyl]-propionyl-D-glucofuranoside and ethyl-2-O-α-[3-chloro-4-cyclohexyl-phenyl]-propionyl-3,5,6-tri-O-n-propyl-D-glucofuranoside, ethyl-2-O-α-[4-isobutyl-phenyl]-propionyl-3,5,6-tri-O-n-propyl-D-glucofuranoside, ethyl-2-O-methyl-3,5-di-O-n-propyl-T26-O-α-[4-isobutyl-phenyl]-propionyl-D-glucofuranoside, ethyl-2-O-[β-methyl-p-(cyclohexen-1-yl)-cinnamoyl]-3,5,6-tri-O-n-propyl-D-glucofuranoside, ethyl-2-O-methyl-3,5-di-O-n-propyl-6-O-[β-methyl-p-(cyclohexen-1-yl)-cinnamoyl]-D-glucofuranoside, ethyl-2-O-methyl-3,5-di-O-n-propyl-6-O-α-[3-chloro-4-(3-pyrrolin-1-yl)-phenyl]-propionyl-D-glucofuranoside, ethyl-2-O-α-[4-(cyclohexen-1-

)-phenyl]-propionyl-3,5,6-tri-O-methyl-D-glucofuranoside, ethyl-2,5,6-tri-O-methyl-3-O-α-[4-(cyclohexen-1-yl)-phenyl]-propionyl-D-glucofuranoside, ethyl-2-O-α-[4-(cyclohexen-1-yl)-phenyl]-propionyl-3-O-n-propyl-5,6-di-O-p-chlorobenzyl-D-glucofuranoside, ethyl-2-O-

G2α-[4-(cyclohexen-1-yl)-phenyl]-propionyl-3,5,6-tri-O-benzyl-D-glucofuranoside, ethyl-2,6-di-O-methyl-3-O-n-propyl-5-O-α-[4-(cyclohexen-1-yl)-phenyl]-propionyl-D-glucofuranoside, ethyl-2-O-α-[4-(cyclohexen-1-yl)-phenyl]-propionyl-3-O- methyl-5,6-di-O-benzyl-D-glucofuranoside, ethyl-2-O-α-[4-(cyclohexen-1-yl)-phenyl]-propionyl-3,6-di-O-benzyl-5-O-methyl-D-glucofuranoside, ethyl-2-O-α-[4-(cyclohexen-1-yl)-phenyl]-propionyl-3,5-di-O-n-propyl-6-O-benzyl-D-glucofuranoside, 1,4-anhydro-2-O-α-[4-(cyclohexen-1-yl)-phenyl]-propionyl-3-O-n-propyl-5,6-di-O-benzyl-D-glucitol, ethyl-2-O-methyl-3-O-n-propyl-5-O-α-[4-(cyclohexen-1-yl)-phenyl]-propionyl-6-desoxy-D-glucofuranoside, ethyl-2,3-di-O-methyl-5-O-α-[4-(cyclohexen-1-yl)-phenyl]-propionyl-6-desoxy-L-idofuranoside, ethyl-2,3,6-tri-O-methyl-5-O-α-[4-(cyclohexen-1-yl)-phenyl]-propionyl-D-glucofuranoside, ethyl-2,3-di-O-methyl-5-O-α-[4-(cyclohexen-1-yl)-phenyl]-propionyl-6-desoxy-D-glucofuranoside and especially ethyl-2,3,5-tri-O-methyl-6-O-α-[4-(cyclohexen-1-yl)-phenyl]-propionyl-D-glucofuranoside and ethyl-2-O-α-[4 -(cyclohexen-1-yl)-phenyl]-propionyl-3,5-di-O-methyl-6-O-benzyl-D-glucofuranoside. These compounds, in the adjuvants arthritis test on rats (on oral administration in doses of about 0.003 g/kg to about 0.03 g/kg) show a pronounced anti-inflammatory action and in the benzoquinone writhing syndrome test (on oral administration in doses of about 0.01 g/kg to about 0.05 g/kg to mice) show a pronounced analgesic component.

The compounds of the invention can be manufactured in a manner which is in itself known, for example if, in a monosaccharide which possesses at least one free or reactive esterified saccharide-hydroxyl group (and wherein the or each remaining saccharide-hydroxyl group can be etherified by an optionally substituted hydrocarbon radical and/or esterified by the acyl radical of an organic acid) the or a free or reactive esterified saccharide-hydroxyl group is converted into a hydroxyl group esterified by an araliphatic carboxylic acid having an anti-inflammatory action and, if desired, a resulting compound is converted into another compound according to the invention, and/or, if desired, a resulting salt is converted into the free compound or into a different salt and/or, if desired, a resulting compound having a salt-forming group is converted into a salt and/or, if desired, a resulting isomer mixture is separated into the individual isomers.

A free hydroxyl group in the starting material can be converted into the desired ester in accordance with an acylation process which is in itself known, for example by reacting an appropriate starting material with a carboxylic acid possessing an anti-inflammatory action, preferably with an appropriate reactive derivative thereof.

A preferentially used reactive derivative of a carboxylic acid possessing an anti-inflammatory action is, for example, a corresponding halide, for example a chloride, or an anhydride, including a mixed anhydride, for example the anhydride with a carbonic acid lower alkyl half-ester (which anhydride can be obtained, for example, by reaction of a suitable salt, for example an ammonium salt, of the acid with a halogenoformic acid lower alkyl ester, for example chloroformic acid ethyl ester) or with a suitable lower alkanecarboxylic acid (which acid may be substituted or unsubstituted), for example trichloroacetic acid or pivalic acid, or an activated ester of the carboxylic acid possessing an anti-inflammatory action, for example an ester with an N-hydroxyamino or N-hydroxyimino compound, for example N-hydroxy-succinimide, or with a lower alkanol (especially methanol) or a phenol, which alkanol or phenol contains one or more electron-attracting groups, for example nitro groups, acyl groups, for example lower alkanoyl, for example acetyl, or aroyl, for example benzoyl groups), carboxyl groups which may be functionally modified (for example, carbo-lower alkoxy groups, for example carbomethoxy or carbethoxy groups), carbamoyl groups (for example N,N-dimethyl-carbamoyl groups), or nitrile groups, examples of such an alkanol or phenol being cyanomethanol or 4-nitrophenol.

If necessary, the reaction may be carried out in the presence of a suitable condensation agent and/or catalyst. An acid can, for example, be used in the presence of a dehydrating condensation agent, for example a carbodiimide, for example dicyclohexylcarbodiimide, optionally together with a catalyst, for example a copper salt, for example cuprous chloride or cupric chloride, or a β-alkinylamine or lower alkoxyacetylene compound, an acid halide can, for example, be used in the presence of a basic, acid-binding condensation agent, for example pyridine or triethylamine, and an anhydride can, for example, be used in the presence of a suitable carbodiimide and optionally of a catalyst, for example zinc chloride.

In a starting material possessing a reactive esterified hydroxyl group, for example a halogen atom (for example a bromine or iodine atom) or a hydroxyl group esterified with a strong organic sulphonic acid, for example a p-toluenesulphonyloxy group, such a group can be converted into the desired O-acyl group, for example by treatment with the salt of an araliphatic carboxylic acid possessing an anti-inflammatory action. Examples of a suitable salt are an alkali metal salt, for example, a sodium or potassium salt, or a silver salt.

The splitting off of an ylidene radical which is present in a compound obtainable by the process of the invention and conjointly etherifies two hydroxyl groups may be effected by treatment with water or with an alcohol, preferably ethyl alcohol, in the presence of an acid, under mild conditions. A benzylidene radical is preferably split off hydrogenolytically.

The acid used to split off an ylidene radical may be a Lewis acid, especially an inorganic acid, for example a mineral acid, for example a hydrogen halide acid, especially hydrochloric acid as well as hydrobromic acid, and also sulphuric acid or phosphoric acid, or an organic acid, for example an organic carboxylic acid, for example formic acid or oxalic acid, or an organic sulphonic acid, for example p-toluenesulphonic acid, or a mixture of acids, for example a mixture of hydrochloric acid or p-toluenesulphonic acid and acetic acid, preferably in the form of glacial acetic acid, or alternatively a salt possessing Lewis acid character.

The above splitting reaction is preferably carried out in the presence of a diluent, and a reactant, for example an alcoholic reactant or an organic acid, for example acetic acid, can simultaneously also serve as the diluent; a mixture of solvents or diluents can also be used. If an alcohol is used, the reaction is preferably carried out in the presence of a hydrogen halide acid, in particular hydrochloric acid, and if water is used the reaction is preferably carried out in the presence of an organic carboxylic acid, especially formic acid or oxalic acid, especially in the presence of acetic acid. The reaction may be carried out, if necessary, with cooling but is preferably carried out at room temperature or at elevated temperature (for example at about 25°C to about 150°C), optionally in a closed vessel under pressure and/or in an inert gas atmosphere, for example a nitrogen atmosphere.

If, in the above elimination reaction, an alcohol is used as the reagent in the presence of an anhydrous acid, especially hydrogen chloride, one of the two hydroxyl groups which are together etherified by the ylidene radical, especially the hydroxyl group of a hemiacetal grouping, can be simultaneously etherified whilst being liberated. The elimination reaction can therefore be employed simultaneously to introduce an etherified hydroxyl group into a compound obtainable according to the process which, for example, does not yet possess a required etherified hydroxyl group.

In a resulting compound possessing a group which can be split off hydrogenolytically, for example a hydroxyl group etherified by an optionally substituted benzyl radical or a benzylidenedioxy group, such a group can be converted into a hydroxyl group in accordance with known methods, for example by treatment with nascent or catalytically activated hydrogen, for example hydrogen in the presence of a noble metal catalyst, for example a palladium catalyst.

In a compound obtainable according to the process possessing a hydroxyl group which is not etherified by a hydrocarbon radical (which hydrocarbon radical may be substituted or unsubstituted), such a group can, if required after being liberated, for example from an esterified hydroxyl group or by splitting off an ylidene radical, and if desired after conversion into a reactive esterified hydroxyl group, be etherified in a manner which is in itself known.

A hydroxyl group can, if the remaining substituents permit this, be liberated from an esterified hydroxyl group, for example by hydrolysis or by alcoholysis, preferably in the presence of a mild basic agent, for example an alkali metal bicarbonate. The liberation of the hydroxyl group can, where appropriate, also take place during the splitting off of an ylidene radical, for example on treatment of an appropriate compound with an alcohol in the presence of an acid. If, during the splitting off of an ylidene group, water in the presence of an acid is used, the two hydroxyl groups etherified by such a group are obtained in the free form. It is also possible to convert an esterified hydroxyl group into a different esterified hydroxyl group.

The etherification of a free hydroxyl group can, for example, be effected by treatment with a reactive ester of a hydroxy compound, for example a reactive ester of an alcohol, for example with an appropriate halide (for example a chloride or bromide) or an appropriate organic sulphonyloxy compound (for example, a p-toluenesulphonyloxy compound), in the presence of a basic agent, for example an alkali metal carbonate (for example sodium carbonate or potassium carbonate) or of silver oxide.

In a compound possessing the free hydroxyl group of a hemi-acetal grouping (such a hydroxyl group may be liberated when splitting off an ylidene radical), such a group may be etherified by treating an appropriate compound with an alcohol in the presence of an acid. As the latter, Lewis acids, for example inorganic acids (for example hydrochloric acid), or organic carboxylic acids (for example acetic acid), or sulphonic acids (for example p-toluenesulphonic acids), and optionally mixtures of acids (for example acetic acid mixed with hydrochloric acid or p-toluenesulphonic acid) as well as salts possessing Lewis acid character, can be used.

An esterified hydroxyl group suitable for etherification, in particular an esterified hydroxyl group belonging to a hemi-acetal grouping, is, for example, an acyloxy group, wherein "acyl" represents the corresponding radical of an organic carboxylic acid, for example of a lower alkanecarboxylic acid (for example, acetic acid) or of an aromatic carboxylic acid (for example benzoic acid) and is preferably a reactive esterified hydroxyl group, above all a hydroxyl group esterified by a hydrogen halide acid. This group therefore is preferably a halogen atom, in particular a bromine atom. An esterified hydroxyl group of a hemi-acetal grouping, for example an acyloxy group or a halogen atom, can for example, be introduced by treating a compound possessing a free hemi-acetal hydroxyl group with a suitable derivative of an organic carboxylic acid, (for example acetic acid) for example an anhydride (for example acetic anhydride) and, if desired, by reaction of an acyl compound thus obtainable with halogen (for example with bromine in acetic acid).

The conversion of an esterified hydroxyl group into an etherified hydroxyl group is preferably carried out by treating the starting material with [n alcohol. The reaction of acyloxy groups in the starting material is preferably carried out in the presence of [n acid, especially mineral acid, for example a hydrogen halide acid, for example hydrochloric acid, and the reaction of a starting material which includes a reactive esterified hydroxyl group is preferably carried out in the presence of a suitable abid-binding agent, for example, a silver, lead or mercury salt or of a corresponding oxide, or of a tertiary base, it also being possible to use a metal derivative of the alcohol, for example an appropriate alkali metal compound, for example a sodium or potassium compound, or an alkaline earth metal compound, for example a magnesium compound, or a silver compound. Instead of an acid, an acid ion exchange resin may be used.

The above reaction is preferably carried out in the presence of a solvent, and an alcoholic reagent can also be used as such.

Compounds obtainable by the process of the invention can be converted into other compounds in a manner which is in itself known. Thus, a compound having a certain monosaccharide form can, under suitable conditions, be converted into a compound having a different monosaccharide form, for example a glucofuranoside having a frde hydroxyl group in the 5-position can be converted into a corresponding glucopyranoside on treatment with a suitable acid, for example one of the above-mentioned Lewis acids, for ewample hydrochloric acid. Instead of an acid, an acid ion exchange resin can also be used.

Furthermore, a hydroxyl group can be converted into an etherified hydroxyl group, the hydroxyl group of a hemi-acetal grouping being converted, for example, as described above, and a phenolic hydroxyl grouping being converted, for example, by treatment with a reactive ester of an alcohol, preferably in the presence of a salt-forming reagent, or with a diazo compound. Furthermore, the etherified hydroxyl group in a hemiacetal grouping can be liberated, for example by treatment with an acid in an aqueous medium. Possible acids include the above-mentioned Lewis acids, for example inorganic acids (for example hydrochloric acid or sulphuric acid) or organic carboxylic acids (for example acetic acid) or sulphonic acids (for example p-toluenesulphonic acids) and also mixtures of such acids (for example, acetic acid mixed with hydrochloric acid or p-toluenesulphonic acid) as well as salts possessing Lewis acid character. The reaction can be carried out in a heterogeneous or homogeneous phase and can be accelerated by adding catalysts, for example catalytic amounts of phosphoric acid. Instead of an acid, an acid ion exchange resin can also be used.

In a compound according to the invention, an unsaturated hydrocarbon radical, for example a lower aliphatic hydrocarbon radical, for example a lower alkenyl radical (for example an allyl radical) can be saturated by treatment with a suitable reducing agent, for example catalytically activated hydrogen (for example hydrogen in the presence of a palladium catalyst). In doing so, a hydrogenolytically removable group can be split off at the same time.

In compounds obtainable according to the process which possess a free hydroxyl group, this hydroxyl group can be esterified in a manner which is in itself known, for example by treatment with an acylating agent which introduces the acyl radical of an organic carboxylic acid. Possible acylating agents include acid derivatives (including, in the case of dicarboxylic acids, for example, their mono-acid derivatives), in particular anhydrides (including internal anhydrides, for example corresponding ketenes), as well as halides, especially chlorides. The preferred procedure is to carry out the reaction with an anhydride, for example, succinic anhydride, in the presence of an acid or basic catalyst, for example, pyridine. The reaction with a carboxylic acid halide, for example a chloride (for example, succinic acid monochloride) can be carried out in the presence of an acid-binding condensation agent, for example a tertiary base or sodium acetate. A free hydroxyl group can also be esterified with the aid of a carboxylic acid in the presence of a suitable condensation agent (for example dicyclohexylcarbodiimide) or of a reactive ester of a carboxylic acid, for example esters with N-hydroxyamino or N-hydroxyimino compounds (for example N-hydroxysuccinimide).

Compounds which include a radical containing a salt-forming group, for example, a free carboxyl group, can be obtained, depending on the reaction conditions, either in the free form or in the form of a salt, and these forms can be converted into one another in a manner which is in itself known. Salts of compounds having a free carboxyl group are, for example, metal salts, especially alkali metal salts, for example sodium or potassium salts, as well as alkaline earth metal salts, for example magnesium or calcium salts, or ammonium salts, for example salts with ammonia or organic bases, for example tri-lower alkylamines, for example trimethylamine or triethylamine, especially the pharmaceutically suitable, physiologically tolerable, non-toxic salts of the above nature. They may be obtained, for example, by treating the free compound with a metal hydroxide or metal carbonate or with ammonia or an amine, or with a suitable ion exchanger.

Compounds with basic groups may be in the form of an acid addition salt, especially a pharmaceutically suitable, physiologically tolerable, salt, for example a salt with an inorganic acid (for example hydrochloric acid, hydrobromic acid, sulphuric acid or phosphoric acid) or with an organic acid, for example an aliphatic, cycloaliphatic, cycloaliphatic-aliphatic, aromatic, araliphatic, hererocyclic or heterocyclic-aliphatic carboxylic acid or a sulphonic acid (for example acetic, propionic, succinic, glycollic, lactic, malic, tartaric, citric, ascorbic, maleic, phenylacetic, benzoic, 4-aminobenzoic, anthranilic, 4-hydroxybenzoic, salicyic, amino-salicylic, embonic or nicotinic acid, or methanesulphonic, ethanesulphonic, 2-hydroxyethanesulphonic, ethylenesulphonic, benzenesulphonic, p-toluenesulphonic, naphthalenesulphonic, sulphanilic or chclohexylsulphamic acid). Salts of this nature can, for example, be obtained by treating a free compound which contains a basic group with an acid or with a suitable anion exchanger.

Because of the close relationship between the compounds of the invention in the free form and in the form of their salts, references to the free compounds or the salts in the preceding and following text are to be understood, where appropriate, to include references to the corresponding salts or free compounds respectively.

The compounds of the invention may be in the form of isomer mixtures, for example racemates or diastereoisomer mixtures, or in the form of the pure isomers, for example optically active components. Isomer mixtures obtained can be separated into the pure isomers in accordance with the known methods. Racemates can be separated into their diastereomeric salts, for example on the basis of physico-chemical differences, for example, differences in solubility, or can be separated into the optically active antipodes by fractional crystallisation from an optically active solvent, or by chromatography, especially thin layer chromatography, on an optically active carrier. In these processes, it is advantageous to isolate the pharmacologically more active or less toxic pure isomer, especially the more active or less toxic active antipode.

The compounds of the invention may be in the form of pure α- or β-anomers or of anomer mixtures. The latter can be separated into the two pure anomers on the basis of the physico-chemical differences of the constituents in a known manner, for example by means of chromatographic separation, for example thin layer chromatography, or by means of any other suitable separation process. Advantageously, the more active of the two anomers is isolated.

The processes described above are carried out in accordance with methods which are in themselves known, in the absence of or, preferably, in the presence of diluents or solvents, if necessary with cooling or warming, under elevated pressure and/or in an inert gas atmosphere, for example a nitrogen atmosphere.

In these processes it is necessary to take into account all substituents present in the molecule. If, for example, easily hydrolysable O-acyl radicals are present, particularly gentle reaction conditions should be used, for example short reaction times, use of mild acid or basic agents in low concentration, stoichiometric ratios of quantities, and selection of suitable catalysts, solvents and temperature and/or pressure conditions.

The invention also relates to those embodiments of the process in which the starting material is a compound obtainable as an intermediate product at any stage of the process and the missing process steps are carried out, or in which the process is stopped at any stage, or in which a starting substance is formed under the reaction conditions or is used in the form of a reactive derivative or salt. Preferably, those starting substances are used which lead to the compounds described above as being particularly valuable.

The starting substances are known or may be manufactured according to methods which are in themselves known. The manufacture of the starting substances is described in more detail below in relation to the starting substances required for the manufacture of the preferred hexofuranose compounds of the formula II.

In a hexafuranose, it is, for example, possible to shield the hydroxyl groups in positions 1 and 2 and, if desired, in positions 5 and 6, by introducing a protective group, which may be denoted for example the group W. W here especially represents an isopropylidene group, but may also represent a benzylidene group. The hydroxyl group in the 3-position can then be etherified by treatment with a reactive ester of an alcohol of the formula $R_3$-OH, for example, a lower aliphatic $R_3$-halide, for example $R_3$-chloride or $R_3$-bromide or a corresponding $R_3$-sulphonyloxy compound, in the presence of a basic agent, for example an alkali metal hydroxide (for example sodium hydroxide or potassium hydroxide) or an alkali metal carbonate (for example sodium carbonate or potassium carbonate) or can be esterified in accordance with the process described above. Under suitable conditions, for example in the presence of silver oxide or of an alkali metal carbonate (for example potassium carbonate), an etherification of the 3-hydroxy group can also be effected in a 3,5-dihydroxy or 3,5,6-trihydroxy compound without at the same time etherifying the hydroxyl groups in the 5- and 6-positions. The tetrahydropyramyl radical is also a suitable protective group for a hydroxyl group.

In an intermediate product thus obtainable, having protected hydroxyl groups in the 5- and 6-position, these groups can be liberated selectively (that is to say without liberating the hydroxyl groups in the 1- and 2-position), for example by treatment with an acid, for example 60 percent strength aqueous acetic acid (for example at 35°) or aqueous ethanolic hydrochloric acid, and can then in turn be etherified or esterified, for example in the above-indicated manner. The latter step can also be carried out in stages, in that a primary hydroxyl group in the 6-position can be etherified or esterified before the hydroxyl group in the 5-position, for example on treatment with an approximately equivalent amount of a reactive ester of the compound of the formula $R_6$-OH in the presence of an approximately equivalent amount of an alkali metal hydroxide or of silver oxide, or in the presence of a suitable acid or a reactive derivative thereof.

It is also possible, in a 5,6-dihydroxy compound which contains an etherified or esterified hydroxyl group in the 3-position, to esterify the 6-hydroxyl group selectively, for example by treatment with a suitable organic sulphonic acid halide (for example p-toluenesulphonyl chloride) and forming the 5,6-epoxy compound by treatment with a suitable basic agent, for example an alkali metal lower alkoxide (for example sodium ethoxide); on splitting the epoxide by treatment with a compound of the formula $R_6$-OH in the presence of a transesterification catalyst, for example an alkali metal alkoxide (for example sodium alkoxide) or of a suitable base (for example pyridine) or with an acid, a 5-hydroxy compound with an etherified or esterified hydroxyl group in the 6-position is obtained. In this compound, the free hydroxyl group in the 5-position can be etherified selectively, for example in the manner described above.

In a similar manner, a 6-desoxy starting substance of the formula II, wherein $R_4$ represents hydrogen, can also be obtained. The appropriate intermediate products are obtained from a corresponding compound having a side chain of the formula

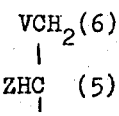

in the 4-position, wherein V represents a group which can be split off by reduction, for example a reactive esterified hydroxyl group, for example an organic sulphonyloxy group (for example the p-toluenesulphonyloxy group) or a halogen atom (for example the iodine atom), and Z represents a free, etherified or esterified hydroxyl group, or wherein V and Z together represent an oxido group. A group represented by V which can be split off by reduction can be replaced by hydrogen, for example by treatment with a hydride reducing agent (for example lithium aluminium hydride) and, in the case of a halogen atom (especially an iodine atom), also by treatment with catalytically activated hydrogen (for example hydrogen in the presence of a palladium catalyst). An oxido group represented by the radicals V and Z together can be split by treatment either with a hydride reducing agent or with catalytically activated hydrogen; the desired 6-desoxy compound, having a free hydroxyl group in the 5-position, is thus obtained.

A hexofuranoside usable as the starting material, which contains a free hydroxyl group in the 6-position, an etherified hydroxyl group in the 3-position and an etherified or esterified hydroxyl group in the 5-position can be formed, for example, if in a 1,2-acetalised or ketalised D-glucofuranose having an etherified hydroxyl group in the 3-position, the free hydroxyl group in the 6-position is selectively protected, for example by the introduction of the trityl group (for example by treatment with trityl chloride in the presence of pyridine) or esterification with an organic sulphonic acid, the hydroxyl group in the 5-position is etherified by treatment with a reactive ester of an alcohol of the formula $R_5$-OH in the presence of a basic agent (for example silver oxide) or is esterified with an acid or a reactive derivative thereof, and the hydroxyl group in the 6-position, is then liberated, optionally together with the hydroxyl groups in the 1- and 2-position, for example by treatment with an acid, such as hydrochloric acid, or selectively, for example by brief treatment with a suitable acid.

At any suitable stage of the processes described above for the manufacture of starting substances, a hydroxyl group etherified by a suitable 2-alkenyl radical (for example the allyl radical) can be liberated, for example by rearrangement of the double bond through treatment with a suitable base, for example an alkali metal tertiary butoxide (for example potassium tertiary butoxide) preferably in a suitable solvent (for example, dimethylsulphoxide) and oxidative-hydrolytic removal of the resulting 1-lower alkenyl group (for example 1-propenyl group) for example by treatment with potassium permanganate, preferably in a basic medium, for example ethanolic alkali metal hydroxide (for example potassium hydroxide), and can, if desired, be etherified or esterified in the indicated manner. The processes described above can be used analogously for the manufacture of starting substances which differ from the preferred hexofuranose compounds.

The physiologically tolerable compounds of the present invention can be used, for example, in the form of pharmaceutical preparations which contain an appropriate amount of the active substance in admixture or conjunction with an inorganic or organic, solid or liquid, pharmaceutically suitable carrier. The carrier may be suitable for enteral, parenteral or topical administration. Suitable carriers include substances which do not react with the compounds of the invention, for example, water, gelatine, lactose, starch, stearyl alcohol, magnesium stearate, talc, vegetable oils, benzyl alcohols, gum, propylene glycols, white petroleum jelly or other known medicinal carriers. The pharmaceutical preparations may, for example, be in the form of tablets, dragees, capsules, suppositories, creams or ointments or in a liquid form as solutions (for example as an elixir or syrup), suspensions or emulsions. The pharmaceutical preparations may be sterilised and/or contain auxiliary substances, for example preservatives, stabilisers, wetting agents and/or emulsifiers, solubilising agents, salts for regulating the osmotic pressure and/or buffers. The pharmaceutical preparations, which may, if desired, contain one or more further pharmacologically valuable substances, may be manufactured in a manner which is in itself known, for example by means of conventional mixing, granulating or dragee-making processes. The preparations may contain from about 0.1 percent to about 75 percent by weight, especially from about 1 percent to about 50 percent, of the active substance.

The following Examples illustrate the invention:

EXAMPLE 1

A solution of 4.7 g of α-[biphenylyl-(4)]-propionic acid chloride in 20 ml of methylene chloride is added dropwise over the course of 1 hour to a solution of 4.3 g of ethyl-3,5,6-tri-O-n-propyl-D-glucofuranoside in 40 ml of absolute pyridine and 20 ml of methylene chloride, at 45° to 50°C in a nitrogen atmosphere, whilst stirring and excluding moisture. After standing for twelve hours at room temperature, the reaction mixture is treated with 10 ml of water and evaporated in a water pump vacuum at 50°C. The resulting residue is taken up in ether and washed with ice-cold 2 N hydrochloric acid, with saturated sodium bicarbonate solution and with water. The ether solution is dired over sodium sulphate and evaporated, and the residue is purified by thin layer chromatography on silica gel PF 254 (Merck-Darmstadt), using elution with chloroform/ethyl acetate (85 : 15). The ethyl-2-O-α-[biphenylyl-(4)]-propionyl-3,5,6-tri-O-n-propyl-D-glucofuranoside of the formula

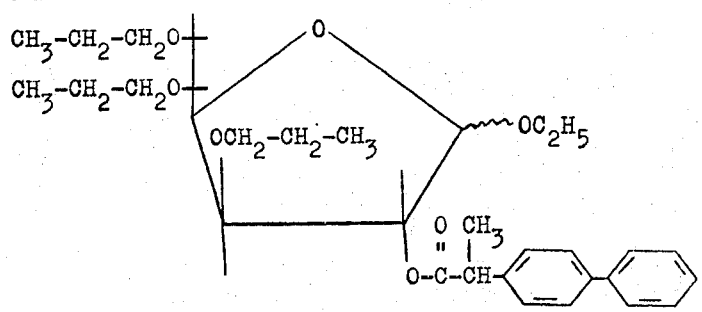

obtained after degassing under a high vacuum is a pale yellow oil of $R_f=0.75$ (silica gel SL 254, Merck-Darmstadt, thin layer plates) in the system chloroform/ethyl acetate (85 : 15) and $[\alpha]_D^{20} = +46° \pm 1°$ (chloroform; c = 0.731).

EXAMPLE 2

16.0 g of ethyl-2-O-methyl-3-O-n-propyl-D-glucofuranoside are dissolved in 200 ml of absolute pyridine, and a solution of 38.0 g of α-[4-(cyclohexen-(1)-yl)-phenyl]-propionic acid chloride in 140 ml of methylene chloride is added dropwise over the course of one hour at 45° to 50°C in a nitrogen atmosphere, whilst stirring and excluding moisture. The mixture is allowed to react for a further hour at 50°C and is then treated with 20 ml of water and evaporated in a water pump vacuum at 50°C. The resulting residue is taken up in ether and washed with ice-cold 2 N hydrochloric acid, with water, with saturated sodium bicarbonate solution and again with water. The ether solution is dried over sodium sulphate and filtered through 400 g of neutral aluminium oxide, and the latter is rinsed with 500 ml of ether. The combined ether solutions are evaporated in a water pump vacuum. The residue, which is degassed for 2 hours under a high vacuum, is ethyl- 2-O-methyl-3-O-n-propyl-5,6-di-O-α-[4-(cyclohexen-1-yl)-phenyl]-propionyl-D-glucofuranoside of the formula

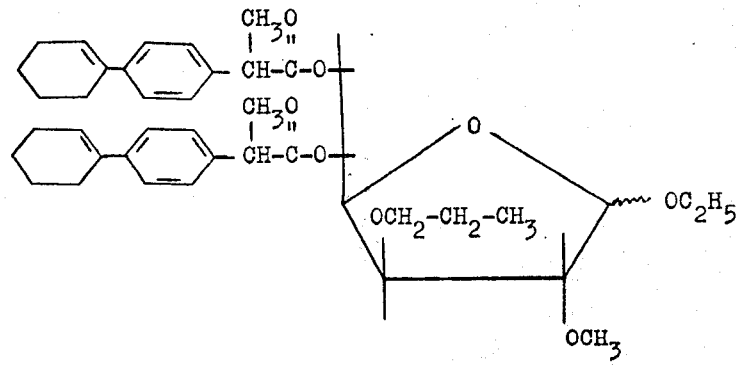

in the form of a colourless viscous oil of $R_f=0.63$ (silica gel SL 254, Merck-Darmstadt, thin layer plates) and $[\alpha]_{20}^D = +9° \pm 1°$ (chloroform c = 1.066).

EXAMPLE 3

A solution of 12.3 g of α-[4-(cyclohexen-1-yl)-phenyl]-propionic acid chloride in 50 ml of methylene chloride is added dropwise over the course of one hour to a solution of 15.0 g of ethyl-2-O-acetyl-3,5-di-O-n-propyl-D-glucofuranoside in 50 ml of absolute pyridine at room temperature, whilst stirring and excluding moisture. After standing for twelve hours at room temperature, the mixture is evaporated in a water pump vacuum at 45° to 50°C. The resulting residue is extracted with ether and the ether solution is washed with icecold 2 N hydrochloric acid, with saturated sodium bicarbonate solution and with water. After drying over sodium sulphate, the ether solution is filtered through 400 g of neutral aluminium oxide and the latter is rinsed with 500 ml of ether. The combined ether solutions are freed of the ether in a water pump vacuum and the residue is degassed for two hours in a high vacuum at 70°C, whereupon ethyl-2-O-acetyl-3,5-di-O-n-propyl-6-O-α-[4-(cyclohexen-1-yl)-phenyl]-propionyl-D-glucofuranoside of the formula

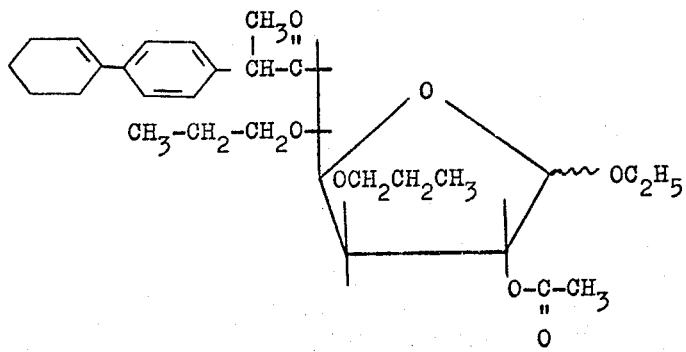

is obtained as a colourless oil of $R_f=0.70$ (silica gel SL 254, Merck-Darmstadt, thin layer plates) and $[\alpha]_D^{20} = +20° \pm 1°$ (chloroform c = 0.791).

EXAMPLE 4

A solution of 8.0 g of α-[4-(cyclohexen-1-yl)-phenyl]-propionic acid chloride in 70 ml of methylene chloride is added over the course of 2 hours to 9.5 g of ethyl-3,5-di-O-methyl-6-O-benzyl-D-glucofuranoside, dissolved in 100 ml of absolute pyridine, at 50° to 55°C in a nitrogen atmosphere, whilst excluding moisture and stirring. The mixture is allowed to react for a further 30 minutes, 20 ml of water are added and the bulk of the methylene chloride and pyridine are distilled off in a water pump vacuum. The residue is extracted with ether and washed with ice-cold 2N hydrochloric acid, with saturated sodium bicarbonate solution and with water. The ether solution is dried over sodium sulphate and filtered through 100 g of basic aluminium oxide, activity level 1 (Woelm, Eschwege, BRD), and the latter is rinsed with 250 ml of ether. The ether solutions are evaporated and the residue is degassed for 2 hours in a high vacuum, whereupon ethyl-2-O-α-[4-(cyclohexen-1-yl)-phenyl]-propionyl-3,5,-di-O-methyl-6-O-benzyl-D-glucofuranoside of the formula

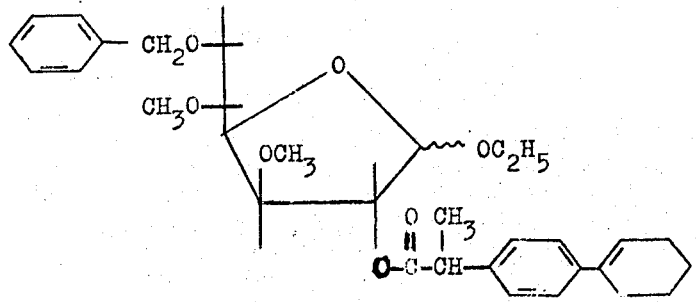

is obtained as a colourless oil of $R_f=0.67$ (silica gel SL 254, Merck-Darmstadt, thin layer plates) and $[\alpha]_D^{20} = +26 \pm 1°$ (c = 0.865 in chloroform).

EXAMPLE 5

A solution of 13.0 g of α-[4-(cyclohexen-1-yl)-phenyl]-propionic acid chloride in 70 ml of methylene chloride is added dropwise over the course of two hours to a solution of 11.9 g of ethyl-2,3,5-tri-O-methyl-D-glucofuranoside in 100 ml of pyridine at 50°C in a nitrogen atmosphere, whilst stirring and excluding moisture. The mixture is allowed to react for a further 30 minutes, 20 ml of water are added, and the bulk of the solvent is distilled off in a water pump vacuum. The resulting residue is extracted with ether. The ether solution is washed with ice-cold 2 N hydrochloric acid, with saturated sodium bicarbonate solution and with water, and is dried over sodium sulphate and filtered through 100 g of basic aluminium oxide, activity level 1 (Woelm, Eschwege, BRD). The filtrate is evaporated in a water pump vacuum and the residue is degassed for two hours in a high vacuum at 70°C, whereupon ethyl-2,3,5-tri-O-methyl-6-O-α-[4-(cyclohexen-1-yl)-phenyl]-propionyl-D-glucofuranoside of the formula

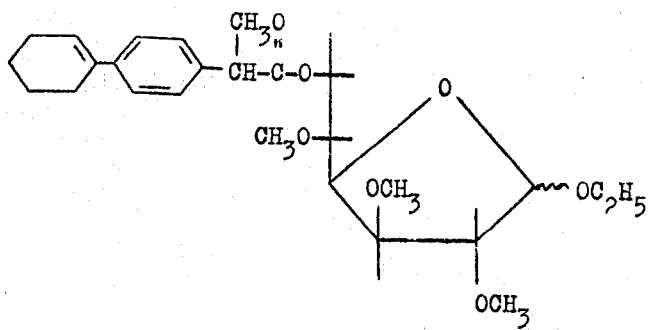

is obtained as a colourless oil of $R_f=0.53$ (silica gel SL 254, Merck-Darmstadt, thin layer plates) and $[\alpha]_D^{20} = +16° \pm 1°$ (c = 1.004 in chloroform).

EXAMPLE 6

A solution of 5.2 g of α-[3-chloro-4-cyclohexyl-phenyl]-propionic acid chloride in 20 ml of methylene chloride is added dropwise over the course of one hour to a solution of 4.05 g of ethyl-3,5,6-tri-O-n-propyl-D-glucofuranoside in 40 ml of absolute pyridine and 20 ml of methylene chloride at 45° to 50°C in a nitrogen atmosphere, whilst stirring and excluding moisture. The reaction is allowed to take place for a further two hours and the reaction mixture is then treated with 10 ml of water and evaporated in a water pump vacuum at 50°C. The resulting residue is taken up in ether and washed with ice-cold 2 N hydrochloric acid, with saturated sodium bicarbonate solution and with water. The ether solution is dried over sodium sulphate and evaporated and the residue is purified by a thin layer chromatography on silica gel PF 254 (Merck-Darmstadt), by elution with chloroform/ethyl acetate (85:15). The ethyl-2-O-α-[3-chloro-4-cyclohexyl-phenyl]-propionyl-3,5,6-tri-O-n-propyl-D-glucofuranoside of the formula

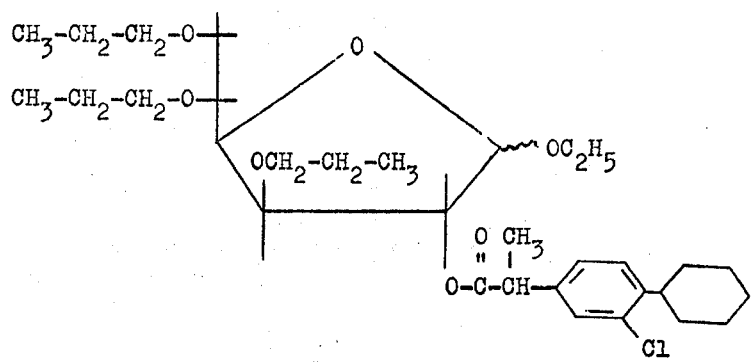

thus obtained and degassed in a high vacuum is obtained as a pale yellowish oil of $R_f=0.73$ (silica gel SL 254, Merck-Darmstadt, thin layer plates) in the system chloroform/ethyl acetate (85:15) and $[\alpha]_D^{20} = +27° \pm 1°$ (chloroform c = 0.758)

EXAMPLE 7

A solution of 19.0 g of α-[4-(cyclohexen-1-yl)-phenyl]-propionic acid chloride in 40 ml of methylene chloride is added dropwise over the course of 2 hours to a solution of 15.5 g of thyl-2-O-methyl-3,5-di-O-n-propyl-D-glucofuranoside in 55 ml of absolute pyridine and 15 ml of methylene chloride at 45° to 50°C in a nitrogen atmosphere, whilst stirring and excluding moisture. The reaction is allowed to take place for a further 30 minutes and the reaction mixture is then treated with 10 ml of water and evaporated at 50°C in a water pump vacuum. The resulting residue is taken up in ether and washed with ice-cold 2 N hydrochloric acid, saturated sodium bicarbonate solution and water. The ether solution is dried over sodium sulphate and evaporated, the residue is taken up in a little ether and charged onto a column containing 120 g of basic aluminium oxide, activity level 1 (Woelm, Eschwege BRD), and the column is eluted with 500 ml of ether. The eluate is evaporated and the residue is degassed for 2 hours in a high vacuum, whereupon ethyl-2-O-methyl-3,5-di-O-n-propyl-6-O-α-[4-(cyclohexen-1-yl)-phenyl]-propionyl-D-glucofuranoside of the formula

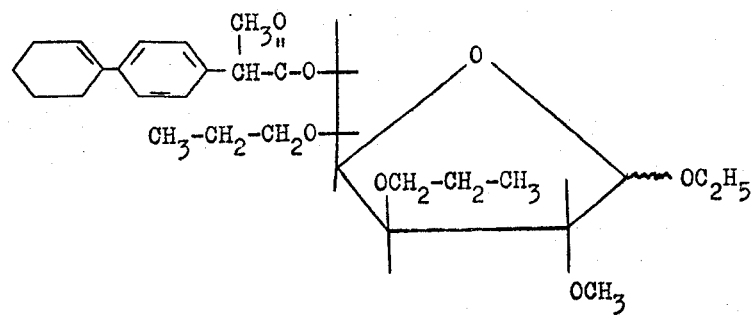

is obtained as a colourless oil of $R_f = 0.60$ (silica gel SL 254, Merck-Darmstadt, thin layer plates) and of optical rotation $[\alpha]_D^{20} = + 10° \pm 0.5°$ (c = 1.733 in chloroform).

EXAMPLE 8

5.0 g of ethyl-2-O-methyl-3,5-O-n-propyl-D-glucofuranoside are dissolved in 40 ml of absolute pyridine and treated dropwise over the course of 3 hours with a solution of 5.0 g of α-[biphenylyl-(4)]-propionic acid chloride in -di-O-n-propyl-D-glucofuranoside ml of methylene chloride at 50° to 55°C in a nitrogen atmosphere, whilst stirring and excluding moisture. The mixture is allowed to react for a further hour at 50°C and is then treated with 10 ml of water and evaporated in a water pump vacuum at 50°C. The resulting residue is taken up in ether and washed with ice-cold 2 N hydrochloric acid, water, saturated sodium bicarbonate solution and again with water. The ether solution is dried over sodium sulphate and evaporated, the residue is taken up in a little ether and charged onto a column containing 40 g of basic aluminium oxide, activity level 1 (Woelm, Eschwege BRD), and the column is eluted with 500 ml of ether. The eluate is evaporated and the residue is degassed for 2 hours under a high vacuum, whereupon pure ethyl-2-O-methyl-3,5-di-O-n-propyl-6-O-α-[biphenylyl-(4)]-propionyl-D-glucofuranoside of the formula

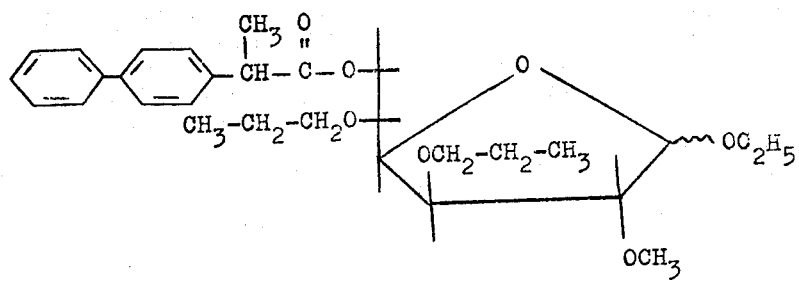

is obtained as a pale yellowish oil of $R_f = 0.58$ (silica gel SL 254, Merck-Darmstadt, thin layer plates) and of optical rotation $[\alpha]_D^{20} = +7° \pm 1°$ (c = 1.206 in chloroform).

EXAMPLE 9

A solution of 10.0 g of α-[3-chloro-4-cyclohexyl-phenyl]-propionic acid chloride in 80 ml of methylene chloride is added dropwise over the course of 2 hours to a solution of 8.6 g of ethyl-2-O-methyl-3,5-di-O-n-propyl-D-glucofuranoside in 80 ml of absolute pyridine at 50° to 55°C in a nitrogen atmosphere, whilst stirring and excluding moisture. After standing for 12 hours at room temperature, the reaction mixture is treated with 10 ml of water and evaporated in a water pump vacuum at 50°C. The resulting residue is taken up in ether and washed with ice-cold 2 N hydrochloric acid, saturated sodium bicarbonate solution and water. The ether solution is dried over sodium sulphate and evaporated, the residue is taken up in a little ether and charged onto a column containing 80 g of basic aluminium oxide, activity level 1 (Woelm, Eschwege BRD) and the column is eluted with 500 ml of ether. The eluate is evaporated and the residue is degassed for 2 hours in a high vacuum, whereupon ethyl-2-O-methyl-3,5-di-O-n-propyl-6-O-α-[3-chloro-4-cyclohexyl-phenyl]-propionyl-D-glucofuranoside of the formula

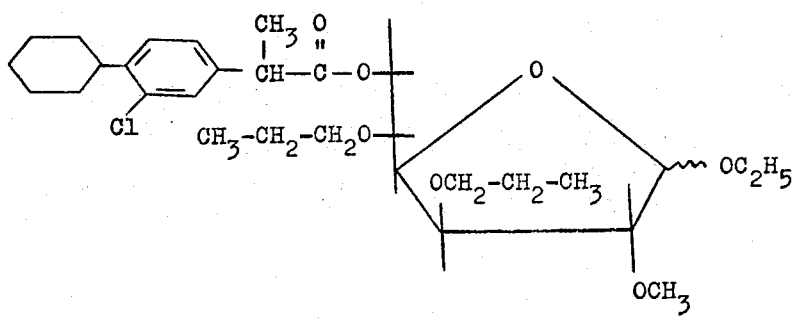

is obtained as a colourless oil of $R_f = 0.65$ (silica gel SL 254, Merck-Darmstadt, thin layer plates) and of optical rotation $[\alpha]_D^{20} = +10° \pm 1°$ (c = 1.421 in chloroform).

EXAMPLE 10

A solution of 10.0 g of α-[4-isobutyl-phenyl]-propionic acid chloride in 80 ml of methylene chloride is added dropwise over the course of 2 hours to a solution of 12.7 g of ethyl-3,5,6-tri-O-n-propyl-D-glucofuranoside in 80 ml of absolute pyridine at 50° to 55°C in a nitrogen atmosphere, whilst stirring and excluding moisture. After standing for twelve hours at room temperature, the reaction mixture is treated with 10 ml of water and evaporated in a water pump vacuum at 50°C. The resulting residue is taken up in ether and washed with ice-cold 2 N hydrochloric acid, saturated sodium bicarbonate solution and water. The ether solution is dried over sodium sulphate and evaporated, the residue is taken up in a little ether and charged onto a column which contains 85 g of basic aluminium oxide, activity level 1 (Woelm, Eschwege, BRD) and the column is eluted with 500 ml of ether. The eluate is evaporated and the residue, which is degassed for 1 hour in a high vacuum, is pure ethyl-2-O-α-[4-isobutyl-phenyl]-propionyl-3,5,6-tri-O-n-propyl-D-glucofuranoside of the formula

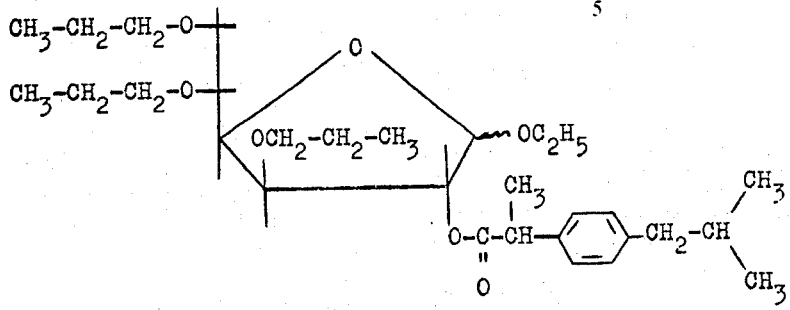

in the form of a slightly yellowish oil of $R_f = 0.62$ (silica gel SL 254, Merck-Darmstadt, thin layer plates) and of optical rotation $[\alpha]_D^{20} = +30° \pm 0.5°$ (c = 1.796 in chloroform).

EXAMPLE 11

11.3 g of ethyl-2-O-methyl-3,5-O-n-propyl-D-glucofuranoside are dissolved in 80 ml of absolute pyridine and treated dropwise over the course of 2 hours with a solution of 10.0 g of α-[4-isobutyl-phenyl]-propionic acid chloride in 80 ml of methylene chloride at 50° to 55°C in a nitrogen atmosphere, whilst stirring and excluding moisture. After standing for 12 hours at room temperature, this reaction mixture is treated with 10 ml of water and evaporated in a water pump vacuum at 50°C. The residue obtained is taken up in ether and washed with ice-cold 2 N hydrochloric acid, saturated sodium bicarbonate solution and water. The ether solution is dried over sodium sulphate and concentrated to 30 ml. This solution is charged onto a column which contains 85 g of basic aluminium oxide, activity level 1 (Woelm, Eschwege, BRD) and the column is eluted with 500 ml of ether. The eluate is evaporated and the residue is degassed in a high vacuum, whereupon pure ethyl-2-O-methyl-3,5-di-O-n-propyl-6-O-α[4-isobutyl-phenyl]-propionyl-D-glucofuranoside of the formula is obtained as a pale yellowish oil of $R_f = 0.57$ (silica gel SL 254, Merck-Darmstadt, thin layer plates) and of optical rotation $[\alpha]_D^{20} = +11° \pm 1°$ (c = 1.576 in chloroform).

EXAMPLE 12

A solution of 8.50 g of β-methyl-p-(cyclohexen-l-yl)-cinnamic acid chloride in 40 ml of methylene chloride is added dropwise over the course of 2 hours to a solution of 8.55 g of ethyl-3,5,6-tri-O-n-propyl-D-glucofuranoside in 40 ml of absolute pyridine at 50° to 55°C in a nitrogen atmosphere, whilst stirring and excluding moisture. The mixture is allowed to react for a further 30 minutes at 50°C and is then left to stand for 12 hours at room temperature. The reaction mixture is treated with 10 ml of water and evaporated in a water pump vacuum at 50°C. The resulting residue is taken up in ether and successively washed with ice water, 2 N ice-cold hydrochloric acid, saturated sodium bicarbonate solution and water. The ether solution is dried over sodium sulphate, filtered, concentrated to 30 ml and charged onto a column containing 100 g of basic aluminium oxide, activity level 1 (Woelm, Eschwege BRD), and the column is eluted with 500 ml of ether. The eluate is evaporated. The residue, degassed in a high vacuum, is pure ethyl-2-O-[β-methyl-p-(cyclohexen-1-yl)-cinnamoyl]-3,5,6-tri-O-n-propyl-D-glucofuranoside of the formula

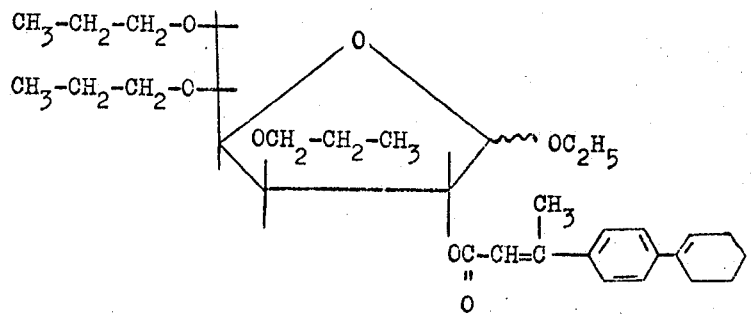

which is a yellowish oil of $R_f = 0.70$ (silica gel SL 254, Merck-Darmstadt, thin layer plates) in the system chloroform-ethyl acetate (85:15), and of optical rotation $[\alpha]_D^{20} = +47° \pm 1°$ (c = 1.481 in chloroform).

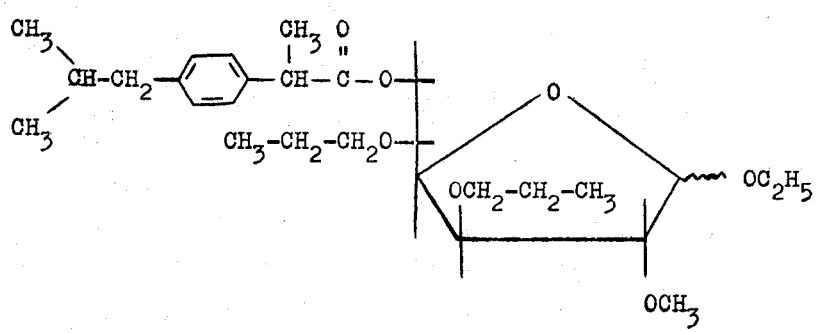

EXAMPLE 13

8.05 g of ethyl-2-O-methyl-3,5-di-O-n-propyl-D-glucofuranoside are dissolved in 40 ml of absolute pyridine and a solution of 8.50 g of β-methyl-p-(cyclohexen-1-yl)-cinnamic acid chloride in 40 ml of methylene chloride is added dropwise over the course of 2 hours at 50° to 55°C in a nitrogen atmosphere, whilst stirring and excluding moisture. After standing for 12 hours at room temperature, the reaction mixture is treated with 10 ml of water and evaporated in a water pump vacuum at 50°C. The residue is taken up in ether and is successively washed with ice water, ice-cold 2 N hydrochloric acid, saturated sodium bicarbonate solution and water. The ether phase is dried over sodium sulphate, filtered, concentrated to 30 ml and charged onto a column containing 140 g of basic aluminium oxide, activity level 1 (Woelm, Eschwege, BRD), and the column is eluted with 500 ml of ether. The eluate is evaporated and degassed in a high vacuum. The yellowish residue obtained is pure ethyl-2-O-methyl-3,5-di-O-n-propyl-6-O-[β-methyl-p-(cyclohexen-1-yl)-cinnamoyl]-D-glucofuranoside of the formula

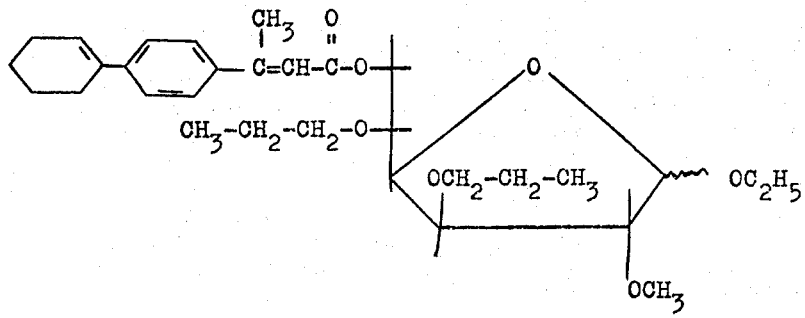

which is a viscous oil of $R_f = 0.65$ (silica gel SL 254, Merck-Darmstadt, thin layer plates) in the system chloroform-ethyl acetate (85:15) and of optical rotation $[\alpha]_D^{20} = -2° \pm 0.5°$ (c = 1.773 in chloroform).

EXAMPLE 14

A solution of 4.8 g of α-[3-chloro-4-(3-pyrrolin-1-yl)-phenyl]-propionic acid chloride in 20 ml of methylene chloride is added dropwise over the course of 2 hours to a solution of 4.8 g of ethyl-2-O-methyl-3,5-di-O-n-propyl-D-glucofuranoside in 20 ml of absolute pyridine at 45° to 50°C in a nitrogen atmosphere, whilst stirring and excluding moisture. After a reaction time of 30 minutes, the reaction mixture is treated with 5 ml of water and evaporated in a water pump vacuum at 50°C. The resulting residue is taken up in ether and is successively washed with ice-cold 2 N hydrochloric acid, saturated sodium bicarbonate solution and water. The ether solution is dried over sodium sulphate, filtered and evaporated and the residue is purified by thin layer chromatography on silica gel PF 254 (Merck-Darmstadt), using elution with chloroform/ethyl acetate (99:1). The ethyl-2-O-methyl-3,5-di-O-n-propyl-6-O-α-[3-chloro-4-(3-pyrrolin-1-yl)-phenyl]-propionyl-D-glucofuranoside of the formula

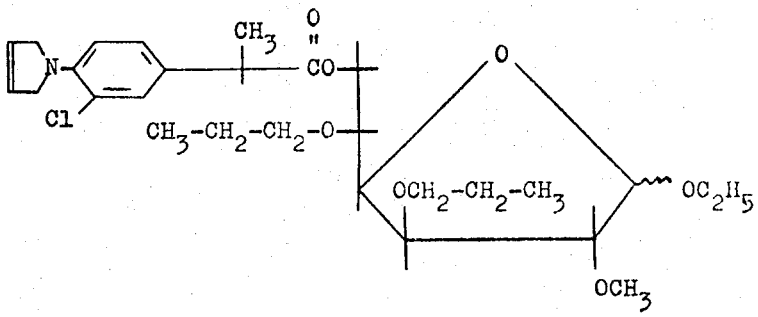

thus obtained and degassed in a high vaccum is a pale yellow oil of $R_f = 0.63$ (silica gel SL 254, Merck-Darmstadt, thin layer plates) in the system chloroform-/ethyl acetate (85:15) and of optical rotation $[\alpha]_D^{20} = +8° \pm 1°$ (chloroform c = 1.617).

EXAMPLE 15

18.2 g of ethyl-3,5,6-tri-O-methyl-D-glucofuranoside and 20.1 g of α-[4-(cyclohexen-1-yl)-phenyl]-propionic acid chloride in 180 ml of absolute pyridine and 100 ml of methylene chloride yield, when reacted according to a process analogous to that described in Example 7 and after purification on 250 g of basic aluminium oxide, activity level 1 (Woelm Eschwege BRD), ethyl-2-O-α-[4-(cyclohexen-1-yl)-phenyl]-propionyl-3,5,6-tri-O-methyl-D-glucofuranoside of the formula

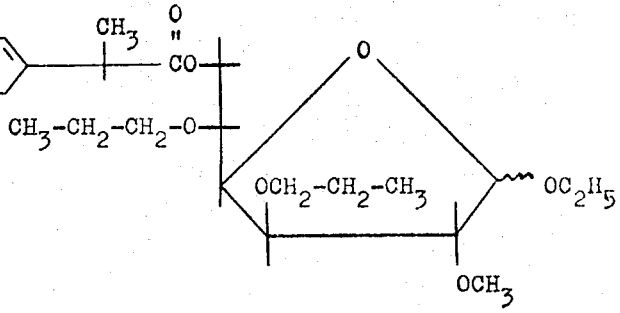

as an almost colourless oil, $R_f = 0.50$, chloroform-/ethyl acetate (85:15) (silica gel SL 254, Merck-Darmstadt, thin layer plates), $[\alpha]_D^{20} = +33° \pm 1°$ (chloroform c =1.145).

EXAMPLE 16

18.2 g of ethyl-2,5,6-tri-O-methyl-D-glucofuranoside and 20.1 g of α-[4-(cyclohexen-1-yl)-phenyl]-propionic acid chloride in 180 ml of absolute pyridine and 100 ml of methylene chloride yeild, when reacted by a process analogous to that described in Example 7, ethyl-2,5,6-tri-O-methyl-3-O-α-[4-(cyclohexen-1-yl)-phenyl]-propionyl-D-glucofuranoside of the formula

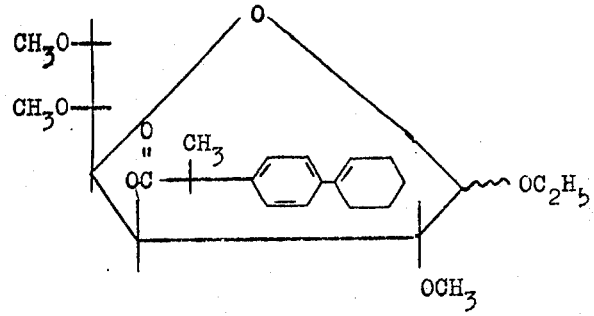

as a slightly yellowish oil of $R_f = 0.32$ and $0.38$ (anomer mixture), chloroform/ethyl acetate (85 : 15) (silica gel SL 254, Merck-Darmstadt, thin layer plates), $[\alpha]_D^{20} = -18° \pm 1°$ (chloroform c = 1.281).

EXAMPLE 17

26.3 g of ethyl-3-O-n-propyl-5,6-di-O-p-chlorobenzyl-D-glucofuranoside and 15.0 g of α-[4-(cyclohexen-1-yl)-phenyl]-propionic acid chloride in 200 ml of absolute pyridine and 100 ml of methylene chloride yield, when reacted according to a process analogous to that described in Example 7 and after purification on a chromatography column, diameter 6 cm, height 90 cm, capacity 1 kg of silica gel (0.05 to 0.2 mm for column chromatography, Marck-Darmstadt) with chloroform-/ethyl acetate (85 : 15) as the eluting agent, and degassing in a high vacuum, pure, slightly yellowish ethyl-2-O-α-[4-(cyclohexen-1-yl)-phenyl]-propionyl-3-O-n-propyl-5,6-di-O-p-chlorobenzyl-D-glucofuranoside of the formula

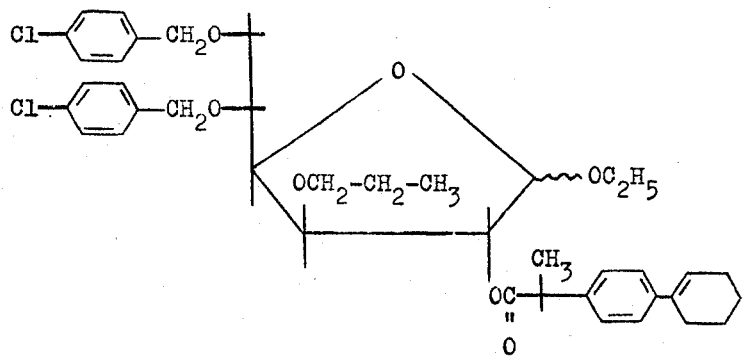

as an oil of $R_f = 0.73$, chloroform/ethyl acetate (85 : 15), silica gel SL 254, Merck-Darmstadt, thin layer plates), $[\alpha]_D^{20} = +26.6° \pm 0.6°$ (chloroform c = 1.212).

EXAMPLE 18

25.2 g of ethyl-3,5,6-tri-O-benzyl-D-glucofuranoside and 15.0 g of α-[4-(cyclohexen-1-yl)-phenyl]-propionic acid chloride in 200 ml of absolute pyridine and 100 ml of methylene chloride yield, when reacted by a method analogous to that described in Example 7 and after purification by chromatography on a 6 cm thick and 90 cm long column containing 1 kg of silica gel (0.05 to 0.2 mm for column chromatography) Merck-Darmstadt, with chloroform : ethyl acetate (85 : 15) as the eluting agent, and degassing in a high vacuum, pure, slightly yellowish ethyl-2-O-α-[4-(cyclohexen-1-yl)-phenyl]-propionyl-3,5,6-tri-O-benzyl-D-glucofuranoside of the formula

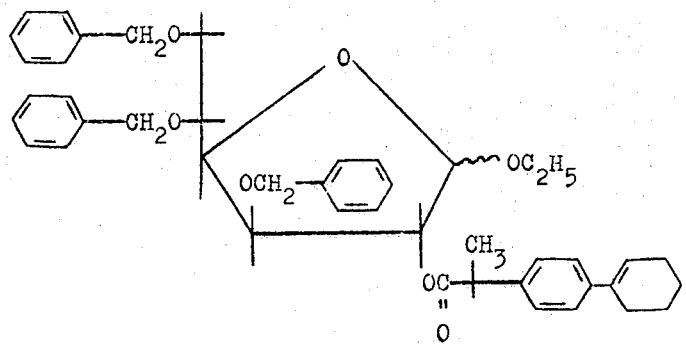

as an oil of $R_f = 0.65$, chloroform : ethyl acetate (85 : 15), silica gel SL 254, Merck-Darmstadt, thin layer plates, $[\alpha]_D^{20} = +3.6° \pm 0.1$ (chloroform c = 2.214).

EXAMPLE 19

10 g of ethyl-2,6-di-O-methyl-3-O-n-propyl-D-glucofuranoside and 10.8 g of α-[4-(cyclohexen-1-yl)-phenyl]-propionic acid chloride in 95 ml of absolute pyridine and 100 ml of methylene chloride yield, when reacted by a method analogous to that described in Example 7 and after purification by chromatography on a 6 cm thick and 90 cm long column containing 1 kg of silica gel (0.05 to 0.2 mm for column chromatography) Merck-Darmstadt, with chloroform: ethyl acetate (85 : 15) as the eluting agent, and degassing in a high vacuum, purel slightly yellowish ethyl-2,6-di-O-methyl- 3-O-n-propyl-5-O-α-[4-(cyclohexen-1-yl)-phenyl]-propionyl-D-glucofuranoside of the formula

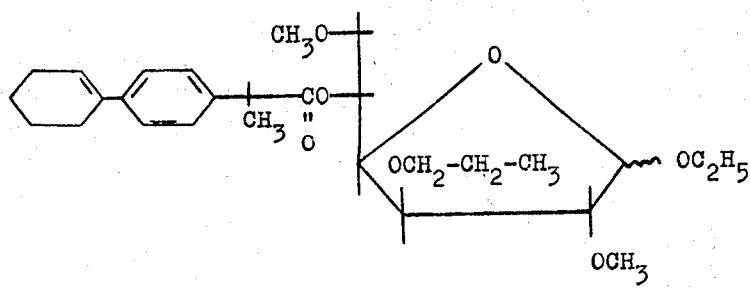

as an oil of $R_f = 0.45$, chloroform : ethyl acetate (85 : 15), silica gel SL 254, Merck-Darmstadt, thin layer plates, $[\alpha]_D^{20} = + 5.7° \pm 0.3°$ (chloroform c =0.934).

EXAMPLES 20 to 27

By using starting materials and reaction methods analogous to those described in Example 19, the following compounds may be obtained:

20. Ethyl-2-O-α-[4-(cyclohexen-1-yl)-phenyl]-propionyl-3-O-methyl-5,6-di-O-benzyl-D-glucofuranoside of the formula

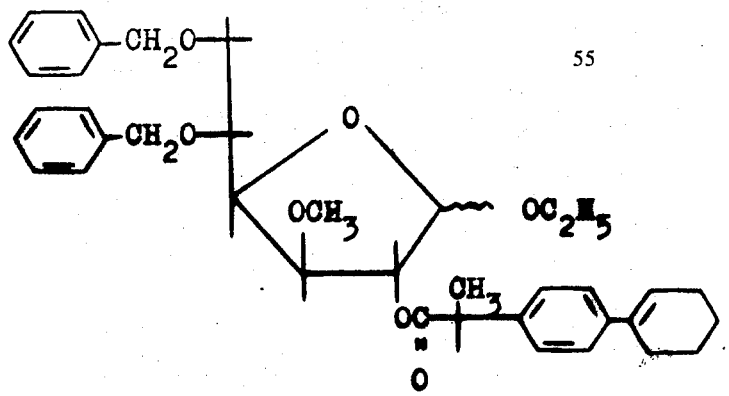

21. Ethyl-2-O-α-[4-(cyclohexen-1-yl)-phenyl]-propionyl-3,6-di-O-benzyl-5-O-methyl-D-glucofuranoside of the formula

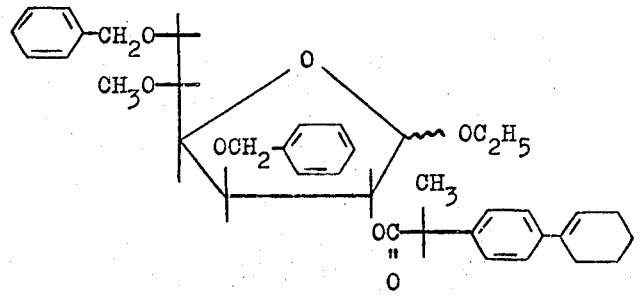

22. Ethyl-2-O-α-[4-(cyclohexen-1-yl)-phenyl]-propionyl-3,5-di-O-n-propyl-6-O-benzyl-D-glucofuranoside of the formula

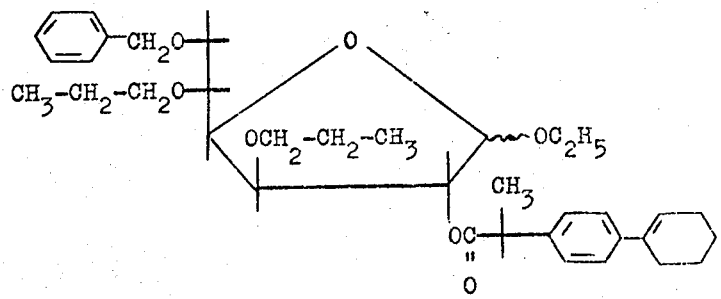

23. 1,4-Anhydro-2-O-α-[4-(cylcohexen-1-yl)-phenyl]-propionyl-3-O-n-propyl-5,6-di-O-benzyl-D-glucitol of the formula 24. Ethyl-2-O-methyl-3-O-n-propyl-5-O-α-[4-(cyclohexen-1-yl)-phenyl]-propionyl-6-desoxy-D-glucofuranoside of the formula

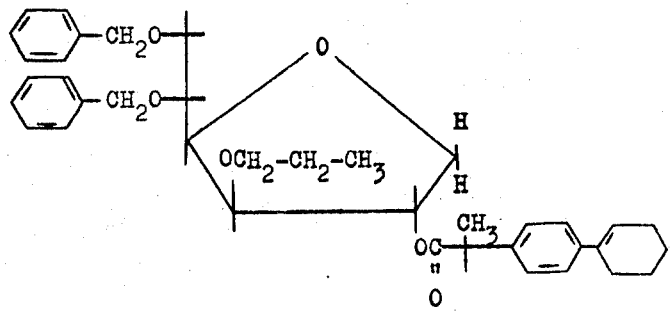

25. Ethyl-2,3-di-O-methyl-5-O-α-[4-(cyclohexen-1-yl)-phenyl]-propionyl-6-desoxy-L-idofuranoside of the formula

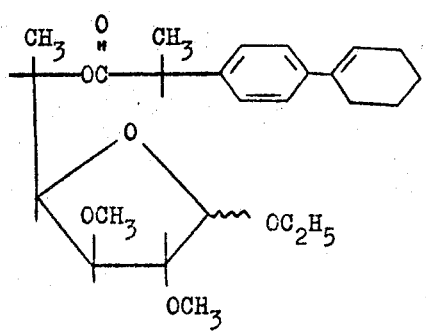

26. Ethyl-2,3,6-tri-O-methyl-5-O-α-[4-(cyclohexen-1-yl)-phenyl]-propionyl-D-glucofuranoside of the formula

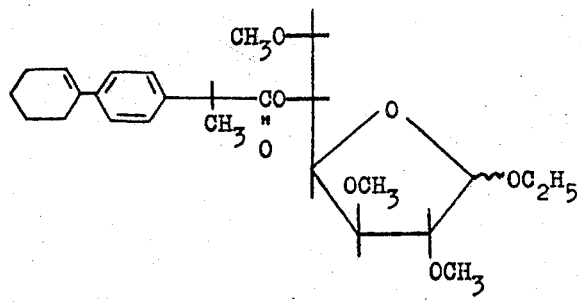

27. Ethyl-2,3-di-O-methyl-5-O-α-[4-(cyclohexen-1-yl)-phenyl]-propionyl-6-desoxy-D-glucofuranoside of the formula

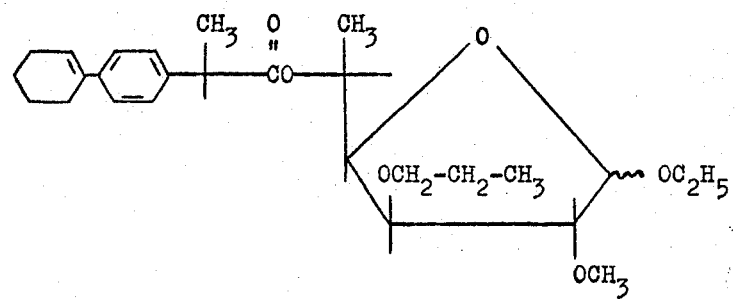

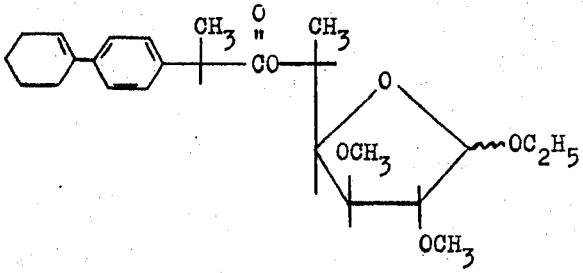

EXAMPLE 28

Capsules containing 0.1 g of the active substance were manufactured as follows (for 10,000 capsules: Composition:

| | |
|---|---|
| Ethyl-2,3,5-tri-O-methyl-6-0-α-[4-(cyclohexen-1-yl)-phenyl]-propionyl-D-glucofuranoside | 1,000 g |
| Absolute ethanol | 100 g |

The ethyl-2,3,5-tri-O-methyl-6-O-α-[4-(cyclohexen-1-yl)-phenyl]-propionyl-D-glucofuranoside is mixed with the ethanol and the mixture is filled into soft gelatine capsules by means of a suitable capsule machine. Instead of the above active substance, one of the compounds described in Examples 1 to 4, 6 and 8 to 12 can, for example, be used.

We claim:
1. A D-glucofuranose compound of the formula III

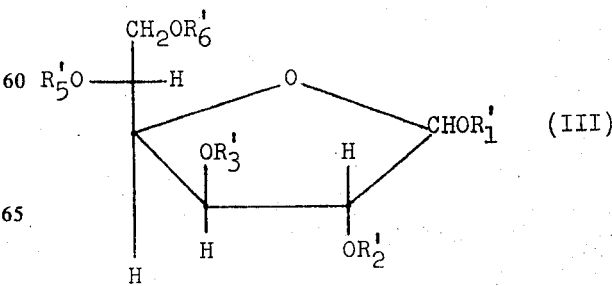

wherein $R_1'$ is lower alkyl; at least one of the symbols $R_2'$, $R_3'$, $R_5'$ and $R_6'$ represents an acyl radical of the formula IV

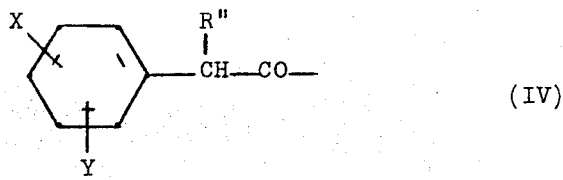

(IV)

in which R" represents hydrogen or lower alkyl, X represents hydrogen or a halogen atom and Y represents phenyl, a 5-membered to 8-membered cycloalkyl or cycloalkenyl group or a straight or branched chain lower alkyl group, and, of the remaining symbols, each of $R_2'$, $R_3'$, $R_5'$ and $R_6'$ represents lower alkyl, benzyl or benzyl substituted in the phenyl radical by halogen, or the acyl radical of a lower alkanecarboxylic acid, with the proviso, that if only $R_2'$ represents a radical of the formula IV, this radical is not phenyl-acetyl, lower alkyl-phenyl-acetyl or halogeno-phenyl-acetyl.

2. A product as claimed in claim 1, wherein $R_1'$ is lower alkyl; at least one of the symbols $R_2'$, $R_3'$, $R_5'$ and $R_6'$ represents an acyl radical of the formula IV and, of the remaining symbols, $R_2'$ represents hydrogen, lower alkyl or the acyl radical of an acetic or propionic acid and each of $R_3'$, $R_5'$ and $R_6'$ represents hydrogen, lower alkyl, benzyl or benzyl substituted in the phenyl radical by halogen atoms, or the acyl radical of an acetic or propionic acid, and wherein R" represents lower alkyl, X represents hydrogen or halogen and Y represents phenyl, a cycloalkyl or cycloalkenyl radical.

3. A product as claimed in claim 1, being a member selected from the group consisting of ethyl-2-O-α-(biphenylyl-(4))-propionyl-3,5,6-tri-O-n-propyl-D-glucofuranoside, ethyl-2-O-methyl-3,5-di-O-n-propyl-6-O-α-(3-chloro-4-cyclohexyl-phenyl)-propionyl-D-glucofuranoside, ethyl-2-O-α-(4-isobutylphenyl)-propionyl-3,5,6-tri-O-n-propyl-D-glucofuranoside, ethyl-2-O-methyl-3,5-di-O-n-propyl-6-O-α-(4-isobutyl-phenyl)-propionyl-D-glucofuranoside, ethyl-2-O-methyl-3,5-di-O-n-propyl-6-O-α-(4-(cyclohexen-1-yl)-phenyl)-propionyl-D-glucofuranoside, ethyl-2-O-methyl-3,5-di-O-n-propyl-6-O-α-(biphenylyl-(4)-propionyl-D-glucofuranoside, ethyl-2-O-acetyl-3,5-di-O-n-propyl-6-O-α-(4-(cyclohexen-1-yl)-phenyl)-propionyl-D-glucofuranoside, ethyl-2-O-methyl-3-O-n-propyl-5,6-di-O-α-(4-(cyclohexen-1-yl)-phenyl)-propionyl-D-glucofuranoside, ethyl-2-O-α-(3-chloro-4-cyclohexyl-phenyl)-propionyl-3,5,6-tri-O-n-propyl-D-glucofuranoside, ethyl-2-O-α-(4-(cyclohexen-1-yl)-phenyl)-propionyl-3,5,6-tri-O-methyl-D-glucofuranoside, ethyl-2,5,6-tri-O-methyl-3-O-α-(4-(cyclohexen-1-yl)-phenyl)-propionyl-D-glucofuranoside, ethyl-2-O-α-(4-(cyclohexen-1-yl)-phenyl)-propionyl-3-O-n-propyl-5,6-di-O-p-chlorobenzyl-D-glucofuranoside, ethyl-2-O-α-(4-(cyclohexen-1-yl)-phenyl)-propionyl-3,5,6-tri-O-benzyl-D-glucofuranoside, ethyl-2,6-di-O-methyl-3-O-n-propyl-5-O-α-(4-(cyclohexen-1-yl)-phenyl)-propionyl-D-glucofuranoside, ethyl-2-O-α-(4-(cyclohexen-1-yl)-phenyl)-propionyl-3-O-methyl-5,6-di-O-benzyl-D-glucofuranoside, ethyl-2-O-α-(4-(cyclohexen-1-yl)-phenyl)-propionyl-3,6-di-O-benzyl-5-O-methyl-D-glucofuranoside, ethyl-2-O-α-(4-(cyclohexen-1-yl)-phenyl)-propionyl-3,5-di-O-n-propyl-6-O-benzyl-D-glucofuranoside and ethyl-2,3,6-tri-O-methyl-5-O-α-(4-(cyclohexen-1-yl)-phenyl)-propionyl-D-glucofuranoside.

4. A product as claimed in claim 1, being ethyl-2,3,5-tri-O-methyl-6-O-α-[4-cyclohexen-1-yl)-phenyl]-propionyl-D-glucofuranoside.

5. A product as claimed in claim 1, being ethyl-2-O-α-[4-(cyclohexen-1-yl)-phenyl]-propionyl-3,5-di-O-methyl-6-O-benzyl-D-glucofuranoside.

6. A product as claimed in claim 1 in the form of a pharmaceutically suitable, physiologically tolerable salt or in the form of an optical antipode.

* * * * *